US012732679B2

(12) United States Patent
Chang et al.

(10) Patent No.: US 12,732,679 B2
(45) Date of Patent: Sep. 8, 2026

(54) CAMERA MODULE AND ELECTRONIC DEVICE

(71) Applicant: LARGAN PRECISION CO., LTD., Taichung City (TW)

(72) Inventors: Lin An Chang, Taichung City (TW); Ming-Ta Chou, Taichung City (TW); Te-Sheng Tseng, Taichung City (TW)

(73) Assignee: LARGAN PRECISION CO., LTD., Taichung City (TW)

( * ) Notice: Subject to any disclaimer, the term of this patent is extended or adjusted under 35 U.S.C. 154(b) by 0 days.

(21) Appl. No.: 18/439,419

(22) Filed: Feb. 12, 2024

(65) Prior Publication Data

US 2024/0187716 A1 Jun. 6, 2024

Related U.S. Application Data

(63) Continuation of application No. 17/838,874, filed on Jun. 13, 2022, now abandoned.

(Continued)

(51) Int. Cl.
*H04N 23/54* (2023.01)
*G02B 27/64* (2006.01)

(Continued)

(52) U.S. Cl.
CPC ........... *H04N 23/54* (2023.01); *G02B 27/646* (2013.01); *H04N 23/55* (2023.01); *H04N 23/685* (2023.01)

(58) Field of Classification Search
CPC ...... H04N 23/54; H04N 23/685; H04N 23/55; G02B 27/646; G02B 13/0065; G02B 7/08

(Continued)

(56) References Cited

U.S. PATENT DOCUMENTS

2017/0108660 A1 4/2017 Kuo et al.
2019/0141248 A1* 5/2019 Hubert .................. H05K 1/189

(Continued)

FOREIGN PATENT DOCUMENTS

CN 212486606 U 2/2021
CN 214097936 U 8/2021

(Continued)

OTHER PUBLICATIONS

WO_2022080720 (Year: 2022).*

(Continued)

*Primary Examiner* — Loi H Tran
(74) *Attorney, Agent, or Firm* — Maschoff Brennan

(57) ABSTRACT

A camera module includes a fixed base, a movable carrier disposed on the fixed base, a guiding element disposed between the fixed base and the movable carrier and providing a degree of freedom of movement of the movable carrier relative to the fixed base, a lens system fixed to the movable carrier, an image sensor configured to receive an optical image signal from the lens system, an auto focus driving device configured to provide a driving force for auto focusing of the lens system, and an image stabilization driving device configured to provide a driving force for image stabilization of the image sensor. The fixed base and the movable carrier each has a guiding structure. The guiding structures correspond to each other and are in contact with the guiding element. Therefore, the movable carrier is movable in a direction parallel to an optical axis of the lens system.

11 Claims, 25 Drawing Sheets

Related U.S. Application Data

(60) Provisional application No. 63/298,938, filed on Jan. 12, 2022.

(51) Int. Cl.
*H04N 23/55* (2023.01)
*H04N 23/68* (2023.01)

(58) Field of Classification Search
USPC ............................................. 348/63, 208.99
See application file for complete search history.

(56) References Cited

U.S. PATENT DOCUMENTS

2019/0190412 A1 6/2019 Choi et al.
2020/0201003 A1 6/2020 Chiang
2020/0314338 A1 10/2020 Johnson et al.
2020/0319439 A1 10/2020 Byon et al.
2021/0080690 A1 3/2021 Lee et al.
2021/0080807 A1 3/2021 Sharma
2021/0195073 A1 6/2021 Saito et al.
2021/0318593 A1 10/2021 Sharma
2021/0333529 A1 10/2021 Yao et al.
2021/0337121 A1 10/2021 Johnson et al.
2021/0349295 A1 11/2021 Yao et al.
2021/0364751 A1 11/2021 Huh et al.
2021/0373279 A1 12/2021 Smyth et al.
2022/0011537 A1* 1/2022 Chang ..................... G03B 3/10
2022/0046154 A1 2/2022 Chang et al.
2022/0163706 A1* 5/2022 Feldman ............ G02B 13/0065
2022/0196993 A1 6/2022 Liao et al.
2022/0294945 A1 9/2022 Zhao et al.

FOREIGN PATENT DOCUMENTS

CN 214409431 U 10/2021
CN 113676650 A 11/2021
JP 2019-020755 A 2/2019
WO 2021/052136 A1 3/2021

OTHER PUBLICATIONS

WO_2020007085 (Year: 2020).*
English Translation of Chinese Publication CN212486606 (Year: 2021).*
TW Office Action dated May 24, 2023 as received in Application No. 111104445.
Extended European Search Report dated Jun. 5, 2023 as received in Application No. 22196971.0.

* cited by examiner 12d
17d
121d
15d
DPE
D
RLS
RLS
DPA
IOA
14d
1d
122d
H2
H1

CAMERA MODULE AND ELECTRONIC DEVICE

RELATED APPLICATIONS

This application is a continuation patent application of U.S. application Ser. No. 17/838,874, filed on Jun. 13, 2022, which claims priority to U.S. Provisional Application 63/298,938, filed on Jan. 12, 2022, which is incorporated by reference herein in its entirety.

BACKGROUND

Technical Field

The present disclosure relates to a camera module and an electronic device, more particularly to a camera module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays. Furthermore, due to the rapid changes in technology, electronic devices equipped with optical systems are trending towards multi-functionality for various applications, and therefore the functionality requirements for the optical systems have been increasing.

In recent years, there is an increasing demand for electronic devices featuring light and thin, but conventional optical systems are difficult to meet both the requirements of high image quality and compactness. Conventional camera modules usually have functionalities such as auto focus, optical image stabilization and optical zoom. However, in order to achieve the above functionalities, the structure of the camera modules becomes more complex and the size thereof also increases, and thus, the size of electronic devices equipped with the camera modules also increases. Generally, in a manufacturing process for optical systems, there are assembly errors between optical components, and there is usually a problem of assembly warpage, thereby increasing defective rate of the optical systems. In addition, it is difficult to install a driving mechanism that can effectively drive optical elements to move in a limited storage space of a conventional optical lens system.

SUMMARY

According to one aspect of the present disclosure, a camera module includes a fixed base, a movable carrier, a guiding element, a lens system, an image sensor, an auto focus driving device and an image stabilization driving device. The movable carrier is disposed on the fixed base. The guiding element is disposed between the fixed base and the movable carrier, and the guiding element provides a degree of freedom of movement of the movable carrier relative to the fixed base. The lens system is fixed to the movable carrier. The image sensor is disposed on an image surface of the lens system and configured to receive optical image signal from the lens system. The auto focus driving device includes a first magnet element and a first coil element disposed corresponding to each other. One of the first magnet element and the first coil element is disposed on the lens system or the movable carrier, another one of the first magnet element and the first coil element is disposed on the fixed base, and the auto focus driving device is configured to provide a driving force for auto focusing of the lens system. The image stabilization driving device is configured to provide a driving force for image stabilization of the image sensor. Each of the fixed base and the movable carrier has a guiding structure, and the guiding structures correspond to each other and are in physical contact with the guiding element, so that the movable carrier is movable in a direction parallel to an optical axis of the lens system. In addition, the camera module further includes a reflection element fixed to the fixed base, and an object-side surface and an image-side surface of the reflection element respectively correspond to the lens system and the image sensor.

According to another aspect of the present disclosure, a camera module includes a fixed base, a movable carrier, a guiding element, a lens system, an image sensor, an auto focus driving device and an image stabilization driving device. The movable carrier is disposed on the fixed base. The guiding element is disposed between the fixed base and the movable carrier, and the guiding element provides a degree of freedom of movement of the movable carrier relative to the fixed base. The lens system is fixed to the movable carrier. The image sensor is disposed on an image surface of the lens system and configured to receive optical image signal from the lens system. The auto focus driving device includes a first magnet element and a first coil element disposed corresponding to each other. One of the first magnet element and the first coil element is disposed on the lens system or the movable carrier, another one of the first magnet element and the first coil element is disposed on the fixed base, and the auto focus driving device is configured to provide a driving force for auto focusing of the lens system. The image stabilization driving device is configured to provide a driving force for image stabilization of the image sensor. Each of the fixed base and the movable carrier has a guiding structure, and the guiding structures correspond to each other and are in physical contact with the guiding element, so that the movable carrier is movable in a direction parallel to an optical axis of the lens system. In addition, the image stabilization driving device includes a second magnet element and a second coil element. The second magnet element is fixed to the fixed base, and the second magnet element is disposed corresponding to the second coil element. The fixed base has at least three gate traces.

According to another aspect of the present disclosure, an electronic device includes one of the aforementioned camera modules.

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
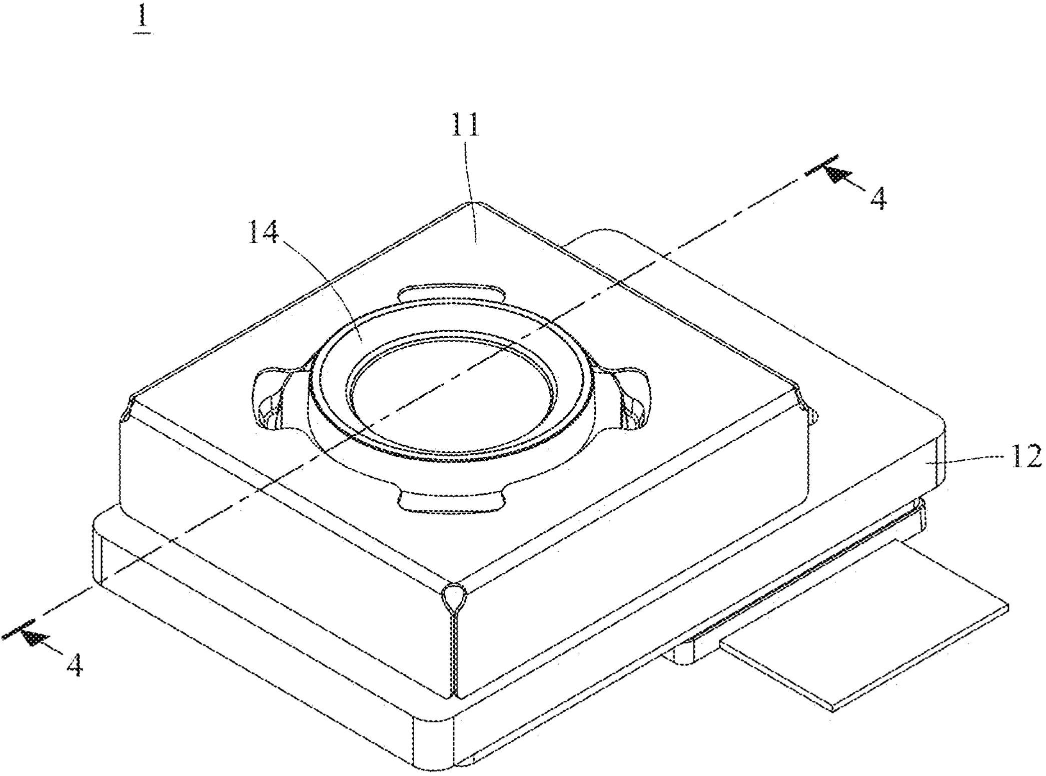
FIG. 1 is a perspective view of a camera module according to the 1st embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The present disclosure provides a camera module. The camera module includes a fixed base, a movable carrier, a guiding element, a lens system, an image sensor, an auto focus driving device and an image stabilization driving device. The movable carrier is disposed on the fixed base. The guiding element is disposed between the fixed base and the movable carrier, and the guiding element provides a degree of freedom of movement of the movable carrier relative to the fixed base. The lens system is fixed to the movable carrier. The image sensor is disposed on an image surface of the lens system and configured to receive optical image signal from the lens system. In addition, the auto focus driving device is configured to provide a driving force for auto focusing of the lens system, and the image stabilization driving device is configured to provide a driving force for image stabilization of the image sensor.

The auto focus driving device includes a first magnet element and a first coil element which are disposed corresponding to each other. One of the first magnet element and the first coil element is disposed on the lens system or the movable carrier, and the other of the first magnet element and the first coil element is disposed on the fixed base.

Each of the fixed base and the movable carrier has a guiding structure, and the guiding structure of the fixed base and the guiding structure of the movable carrier correspond to each other and are in physical contact with the guiding element, so that the movable carrier is movable in a direction parallel to an optical axis of the lens system. In addition, the guiding element may be, for example, a ball, and the guiding structures may be, for example, rails, grooves or accommodation recesses, but the present disclosure is not limited thereto.

According to the present disclosure, the camera module features auto focus and image stabilization functionalities, and the camera module with the above described configuration can have a higher assembly accuracy. Furthermore, the drivable components (e.g., the movable carrier, the lens system and the image sensor) are configured to be movable relative to the fixed base, such that the difficulty of driving control can be reduced so as to achieve more accurate control efficiency.

The camera module can further include a reflection element fixed to the fixed base. The reflection element has an object-side surface corresponding to the lens system, and the reflection element has an image-side surface corresponding to the image sensor. Moreover, the fixed base has no relative motion with respect to the reflection element, and the fixed base can also define the movement range of the movable carrier so as to reduce assembly errors. Furthermore, the reflection element remained fixed in position can reduce the difficulty of driving control so as to achieve more accurate control efficiency. In addition, the reflection element is applicable to optical designs where the back focal length space is reduced. Moreover, the reflection element can have at least two reflection surfaces configured to reflect imaging light so as to be applicable to optical designs where the geometric space is reduced, which is favorable for the miniaturization of the camera module and prevents mirror image signals. The reflection element may be, for example, a reflection mirror or a prism, but the present disclosure is not limited thereto. In some aspects, the reflection element may be a plastic reflection element, and the reflection element is formed by injection molding process. Therefore, it is favorable for the feasibility of mass production. In some aspects, the reflection element may be a glass reflection element, and the present disclosure is not limited thereto. The number of reflection element can be one or plural, and the present disclosure is not limited thereto.

The lens system, the reflection element and the image sensor can be arranged in sequence in the direction parallel to the optical axis of the lens system. Therefore, it is favorable for improving automation efficiency. The aforementioned arrangement manner is an arrangement order for easier assembling.

The image stabilization driving device can include a second magnet element and a second coil element. The second magnet element is fixed to the fixed base, and the second magnet element is disposed corresponding to the second coil element. In addition, the second coil element can directly or indirectly drive the image sensor to move relative to the fixed base. Therefore, it is favorable for providing the image sensor with faster and more accurate image stabilization driving control. Moreover, the image stabilization driving device can further include a flexible printed circuit and an elastic support element, but the present disclosure is not limited thereto. In some aspects, the second coil element and the image sensor are movably disposed on the flexible printed circuit, such that the second coil element can indirectly drive the image sensor to move via the flexible printed circuit.

In some aspects, the first coil element of the auto focus driving device is disposed on the fixed base, and the first magnet element of the auto focus driving device is disposed on the lens system or the movable carrier. The second coil element of the image stabilization driving device and the first magnet element of the auto focus driving device are movable relative to the fixed base. Therefore, through such driving configuration, the interferences on control signals can be reduced.

The fixed base can have at least three gate traces. Therefore, it is favorable for providing the fixed base with high molding precision so as to reduce the probability of misalignment between components. Moreover, the fixed base can include a black plastic material, and the fixed base can be formed by injection molding process. In addition, the gate traces can be disposed on desired positions of the fixed base according to molding requirements so as to achieve better molding efficiency.

The fixed base can have a first accommodation portion and a second accommodation portion. The reflection element is disposed in the first accommodation portion, and the movable carrier is disposed in the second accommodation portion. Moreover, when a height of the first accommodation portion in the direction parallel to the optical axis is H1, and a height of the second accommodation portion in the direction parallel to the optical axis is H2, the following condition can be satisfied: $0.3<H1/H2<3.3$. Therefore, it is favorable for ensuring a more stable space arrangement range in the fixed base. Moreover, the following condition can also be satisfied: $0.5\leq H1/H2\leq 2.5$. Therefore, it is favorable for further reducing assembly warpage between components and providing high-spec optical image quality. Please refer to FIG. 6, which shows a schematic view of H1 and H2 according to the 1st embodiment of the present disclosure.

When a maximum field of view of the lens system is FOV, the following condition can be satisfied: 1 degree$\leq$FOV$\leq$45 degrees. Therefore, it is favorable for providing the camera module with telephoto features. Furthermore, it is also applicable to the telephoto camera module with small field of view.

When a focal length of the lens system is EFL, the following condition can be satisfied: 10 mm$\leq$EFL$\leq$35 mm. Therefore, it is favorable for providing the telephoto camera module with high resolution. Furthermore, it is also applicable to the telephoto camera module with long focal length.

When a distance between a center of the image sensor and the optical axis of the lens system is D, the following condition can be satisfied: 4 mm<D<18 mm. Therefore, optical designs of long-focus imaging systems can be realized under limited geometric space. Moreover, the following condition can also be satisfied: 5 mm<D<15 mm. Therefore, it is favorable for further eliminating stray light. Please refer to FIG. 4, which shows a schematic view of D according to the 1st embodiment of the present disclosure.

The present disclosure provides an electronic device including the aforementioned camera module. Therefore, the electronic device provided with the camera module can be in a compact size.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
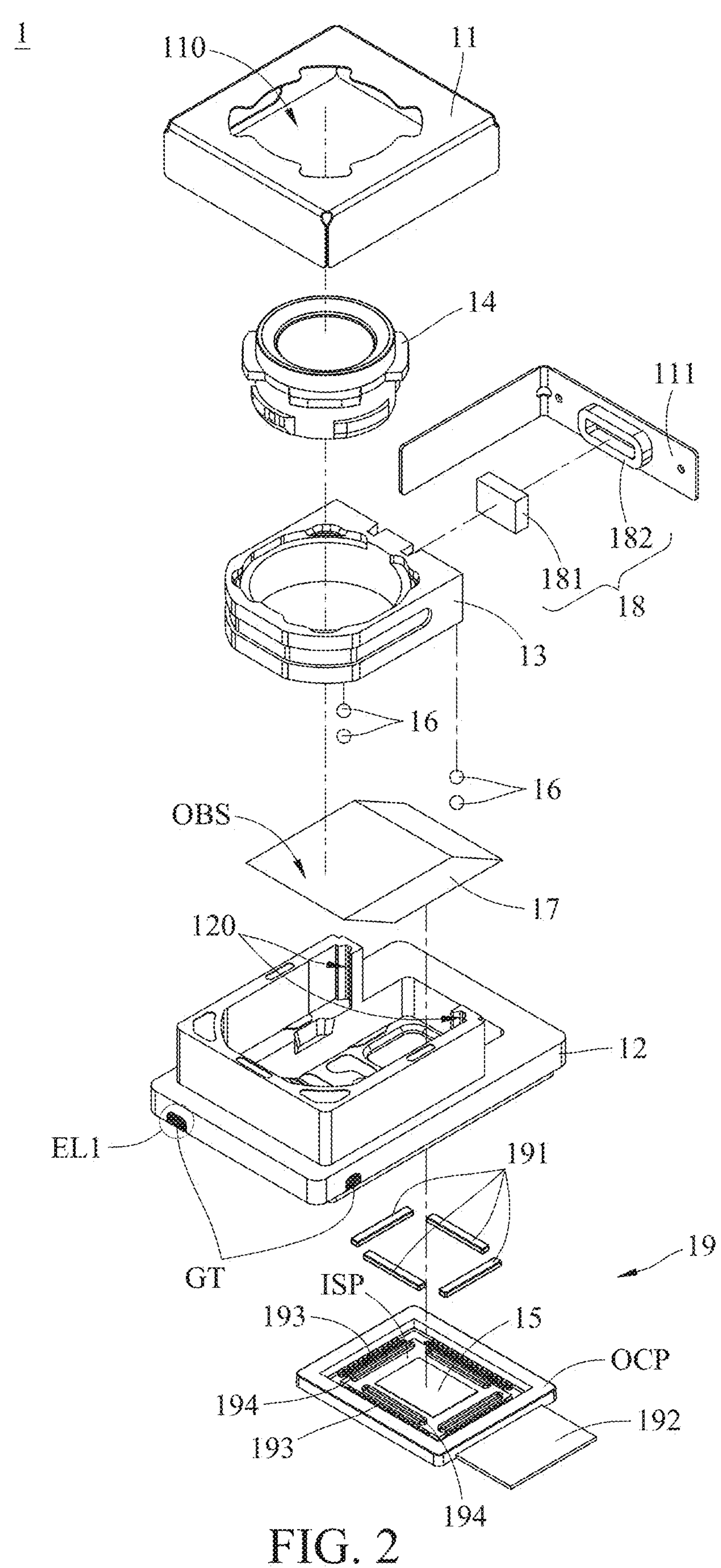
FIG. 2 is an exploded view of the camera module in FIG. 1.
Figure 3:
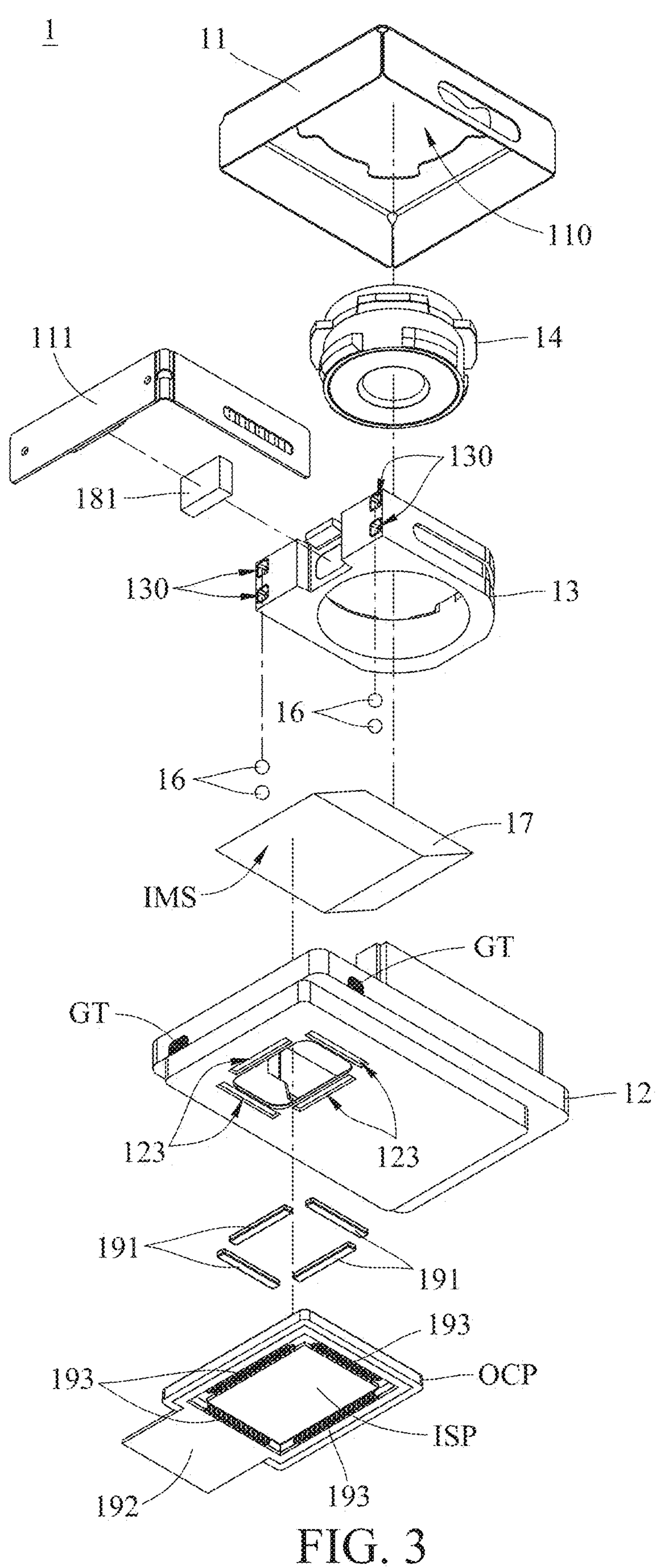
FIG. 3 is another exploded view of the camera module in FIG. 1.
Figure 4:
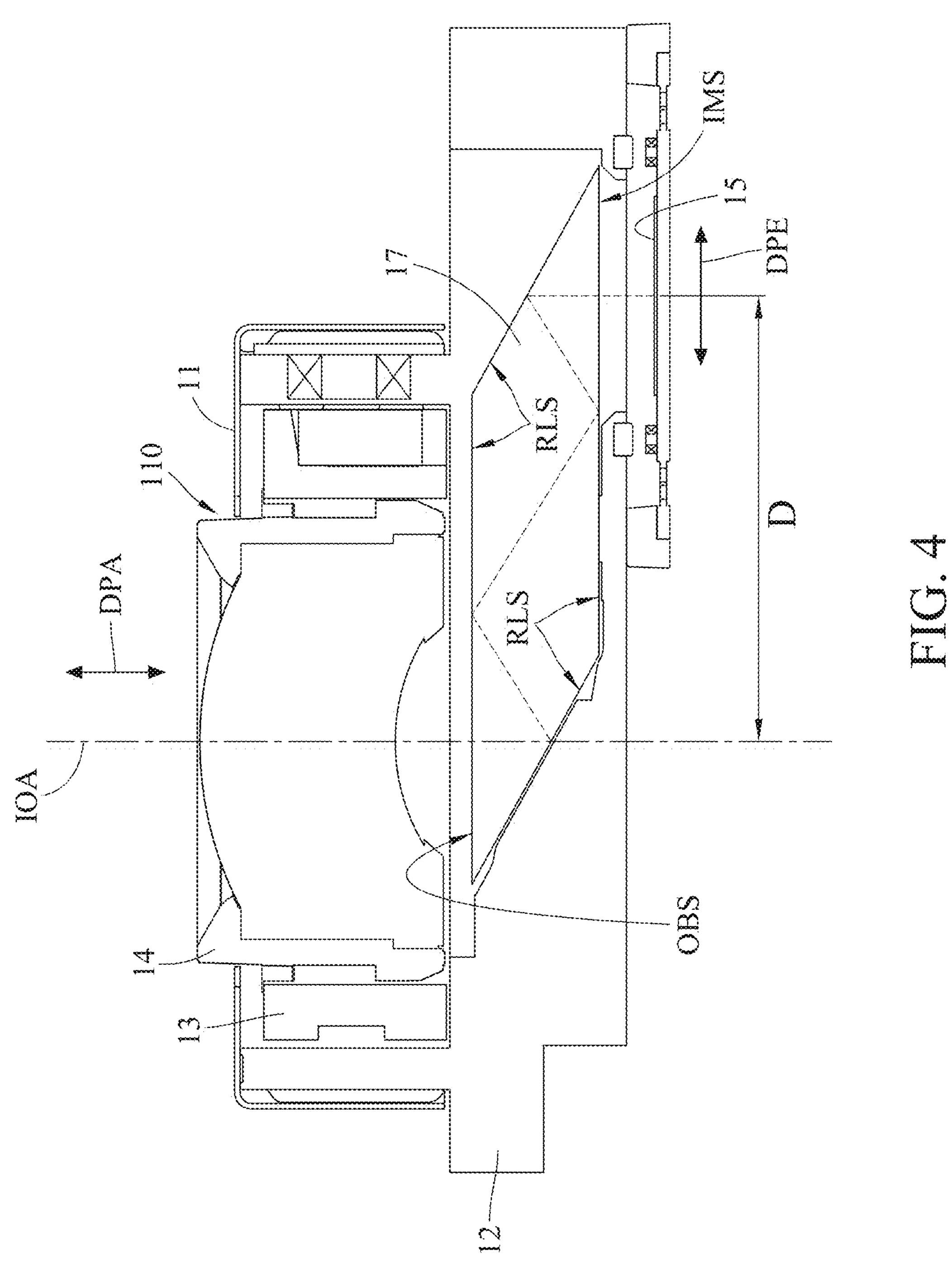
FIG. 4 is a cross-sectional view of the camera module along line 4-4 in FIG. 1.
Figure 5:
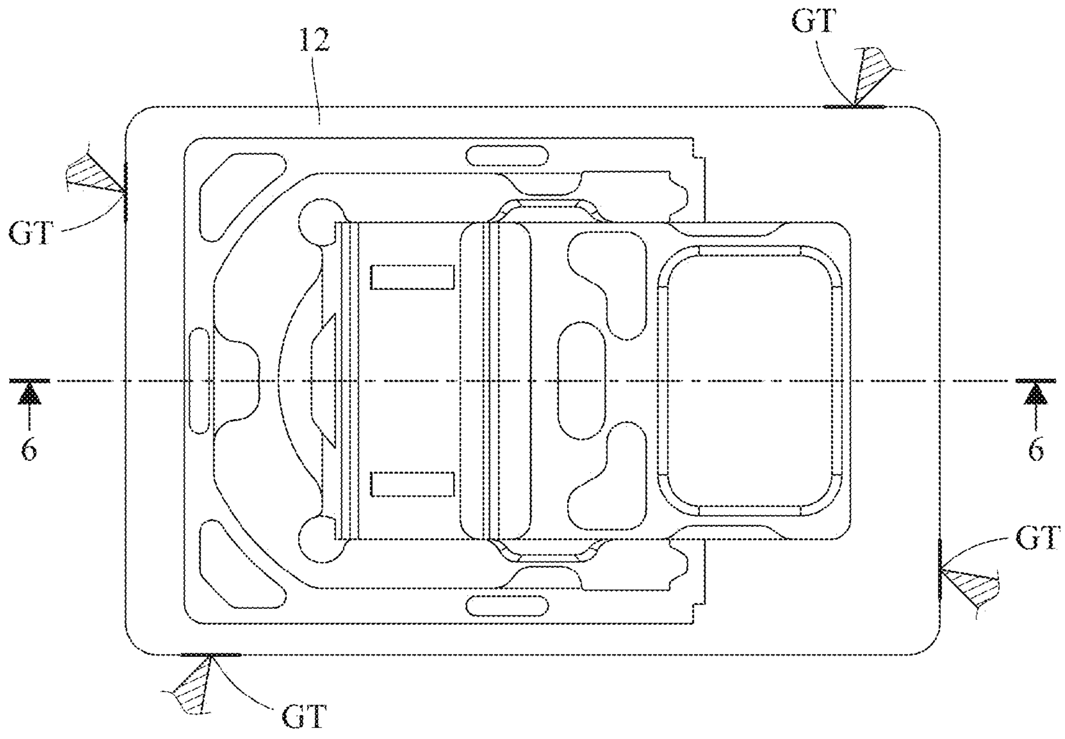
FIG. 5 is a top view of a fixed base of the camera module in FIG. 1.
Figure 6:
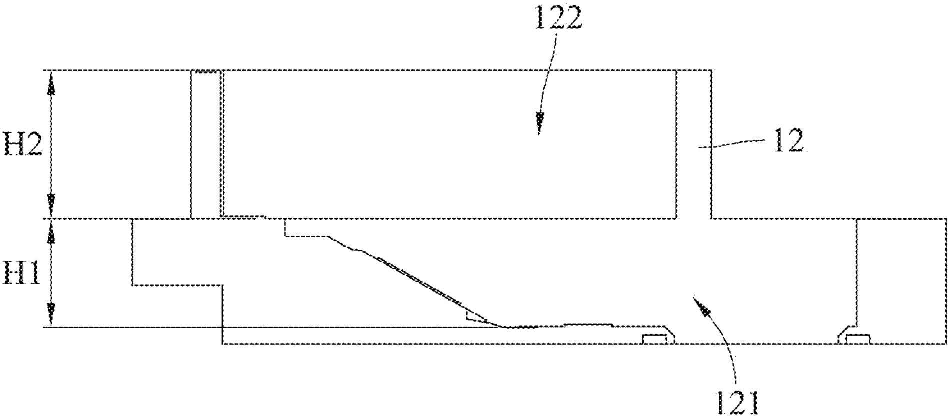
FIG. 6 is a cross-sectional view of the fixed base of the camera module along line 6-6 in FIG. 5.
Figure 7:
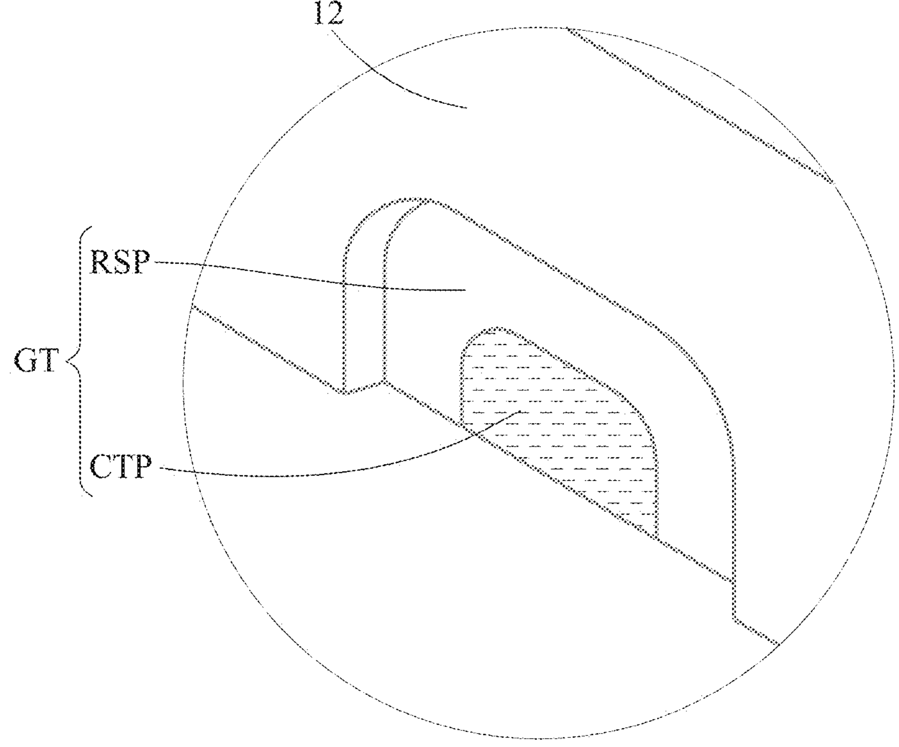
FIG. 7 is an enlarged view of region EL1 in FIG. 2.

FIG. 1 is a perspective view of a camera module according to the 1st embodiment of the present disclosure, FIG. 2 is an exploded view of the camera module in FIG. 1, FIG. 3 is another exploded view of the camera module in FIG. 1, FIG. 4 is a cross-sectional view of the camera module along line 4-4 in FIG. 1, FIG. 5 is a top view of a fixed base of the camera module in FIG. 1, FIG. 6 is a cross-sectional view of the fixed base of the camera module along line 6-6 in FIG. 5, and FIG. 7 is an enlarged view of region EL1 in FIG. 2.

In this embodiment, a camera module 1 includes a casing 11, a fixed base 12, a movable carrier 13, a lens system 14, an image sensor 15, four guiding elements 16, a reflection element 17, an auto focus driving device 18 and an image stabilization driving device 19.

The casing 11 is disposed on the fixed base 12 and forms an accommodation space together with the fixed base 12, and the fixed base 12 has a first accommodation portion 121 and a second accommodation portion 122. The movable carrier 13 is located in the accommodation space and disposed in the second accommodation portion 122 of the fixed base 12. The lens system 14 is fixed to the movable carrier 13, and the lens system 14 is disposed through an opening 110 of the casing 11. The image sensor 15 is disposed on an image surface of the lens system 14 and configured to receive optical image signal from the lens system 14.

The guiding elements 16 are disposed between the fixed base 12 and the movable carrier 13, and the guiding elements 16 provide a degree of freedom of movement of the movable carrier 13 relative to the fixed base 12. In detail, the fixed base 12 further has a guiding structure 120, the movable carrier 13 has a guiding structure 130, and the guiding structures 120 and 130 correspond to each other and are in physical contact with the guiding elements 16. In this embodiment, the four guiding elements 16 are balls. The guiding structure 130 of the movable carrier 13 includes four accommodation recesses respectively accommodating the four guiding elements 16, such that the relative position between the guiding elements 16 is fixed. The guiding structure 120 of the fixed base 12 includes two grooves, each of the grooves is in physical contact with two of the guiding elements 16, and the guiding structure 120 defines a movement range of the movable carrier 13. Through the collaboration among the guiding elements 16, the guiding structure 120 of the fixed base 12 and the guiding structure 130 of the movable carrier 13, the movable carrier 13 is movable relative to the fixed base 12 in a direction DPA parallel to an optical axis IOA of the lens system 14.

The reflection element 17 is disposed in the first accommodation portion 121 of the fixed base 12, and the fixed base 12 has no relative motion with respect to the reflection element 17. The reflection element 17 has an object-side surface OBS corresponding to the lens system 14, and the reflection element 17 has an image-side surface IMS corresponding to the image sensor 15. Furthermore, the lens system 14, the reflection element 17 and the image sensor 15 are arranged in sequence in the direction DPA parallel to the optical axis IOA of the lens system 14. In this embodiment, the reflection element 17 has four reflection surfaces RLS configured to reflect an imaging light (as shown in FIG. 4) so as to be applicable to optical designs where the geometric space is reduced, which is favorable for the miniaturization of the camera module 1 and prevents mirror image signals. In this embodiment, the reflection element 17 can be a plastic reflection element or a glass reflection element.

The auto focus driving device 18 is configured to provide a driving force for auto focusing of the lens system 14. In detail, the auto focus driving device 18 includes a first magnet element 181 and a first coil element 182. The first magnet element 181 is disposed on the movable carrier 13, and the first coil element 182 is disposed on a fixed plate 111 of the casing 11 and corresponds to the first magnet element 181. Since the casing 11 is fixed to the fixed base 12, the first coil element 182 disposed on the fixed plate 111 of the casing 11 is fixed on the fixed base 12 via the casing 11; that is, the first coil element 182 has no relative motion with respect to the fixed base 12. The first magnet element 181 disposed on the movable carrier 13 and the first coil element 182 are configured to interact with each other to produce an electromagnetic driving force (i.e., a Lorentz force generated by an electromagnetic interaction) for driving the movable carrier 13 to move together with the first magnet element 181 relative to the fixed base 12, and with the collaboration of the guiding elements 16, the guiding structure 120 of the fixed base 12 and the guiding structure 130 of the movable carrier 13, the movable carrier 13 and the lens system 14 disposed on the movable carrier 13 can be moved relative to the fixed base 12 in the direction DPA parallel to the optical axis IOA of the lens system 14 (as shown in FIG. 4) so as to achieve auto focus.

The image stabilization driving device 19 is configured to provide a driving force for image stabilization of the image sensor 15. In detail, the image stabilization driving device 19 includes four second magnet elements 191, a flexible printed circuit 192, a plurality of elastic support elements 193 and four second coil elements 194. The second magnet elements 191 is fixed to four magnet accommodation parts 123 of the fixed base 12, and the magnet accommodation parts 123 are, for example, containers in a shape corresponding to the second magnet elements 191. The flexible printed circuit 192 is disposed on the fixed base 12. The flexible printed circuit 192 includes an inner substrate ISP and an outer substrate OCP surrounding the inner substrate ISP. The outer substrate OCP is attached to the fixed base 12. The inner substrate ISP is movably and physically connected to the outer substrate OCP via the elastic support elements 193, and the inner substrate ISP is also electrically connected to the outer substrate OCP. The second coil elements 194 and the image sensor 15 are disposed on the inner substrate ISP and movable relative to the outer substrate OCP via the elastic support elements 193. The second magnet elements 191 respectively correspond to four sides of the image sensor 15, and the second coil elements 194 and the second magnet elements 191 are disposed corresponding to each other. Therefore, the second coil elements 194 and the second magnet elements 191 can interact with each other to produce an electromagnetic driving force for driving the inner substrate ISP together with the image sensor 15 to move relative to the fixed base 12. In this embodiment, the image sensor 15 is movable relative to the fixed base 12 in a direction DPE perpendicular to the optical axis IOA of the lens system 14 (as shown in FIG. 4) so as to achieve image stabilization.

In this embodiment, the second coil elements 194 of the image stabilization driving device 19 and the first magnet element 181 of the auto focus driving device 18 are movable relative to the fixed base 12, and through such driving configuration, the interferences on control signals can be reduced.

In this embodiment, the lens system 14, the reflection element 17 and the image sensor 15 are arranged in sequence in the direction DPA parallel to the optical axis IOA of the lens system 14, which is an order of arrangement for easier assembling, thereby improving automation efficiency.

In this embodiment, the fixed base 12 is formed by injection molding process and has four gate traces GT. The four gate traces GT are respectively disposed near to corners of four sides of the fixed base 12 for achieving better molding efficiency. In this embodiment, the fixed base 12 may include a black plastic material. As shown in FIG. 7, each of the gate traces GT includes a recessed surface portion RSP and a cutting trace portion CTP, but the present disclosure is not limited thereto.

When a height of the first accommodation portion 121 of the fixed base 12 in the direction DPA parallel to the optical axis IOA is H1, and a height of the second accommodation portion 122 of the fixed base 12 in the direction DPA parallel to the optical axis IOA is H2, the following conditions are satisfied: H1=2.78 mm; H2=3.8 mm; and H1/H2=0.73.

When a maximum field of view of the lens system 14 is FOV, the following condition is satisfied: FOV=20.3 degrees.

When a focal length of the lens system 14 is EFL, the following condition is satisfied: EFL=17.0 mm.

When a distance between a center of the image sensor 15 and the optical axis IOA of the lens system 14 is D, the following condition is satisfied: D=8.066 mm.

2nd Embodiment

Figure 8:
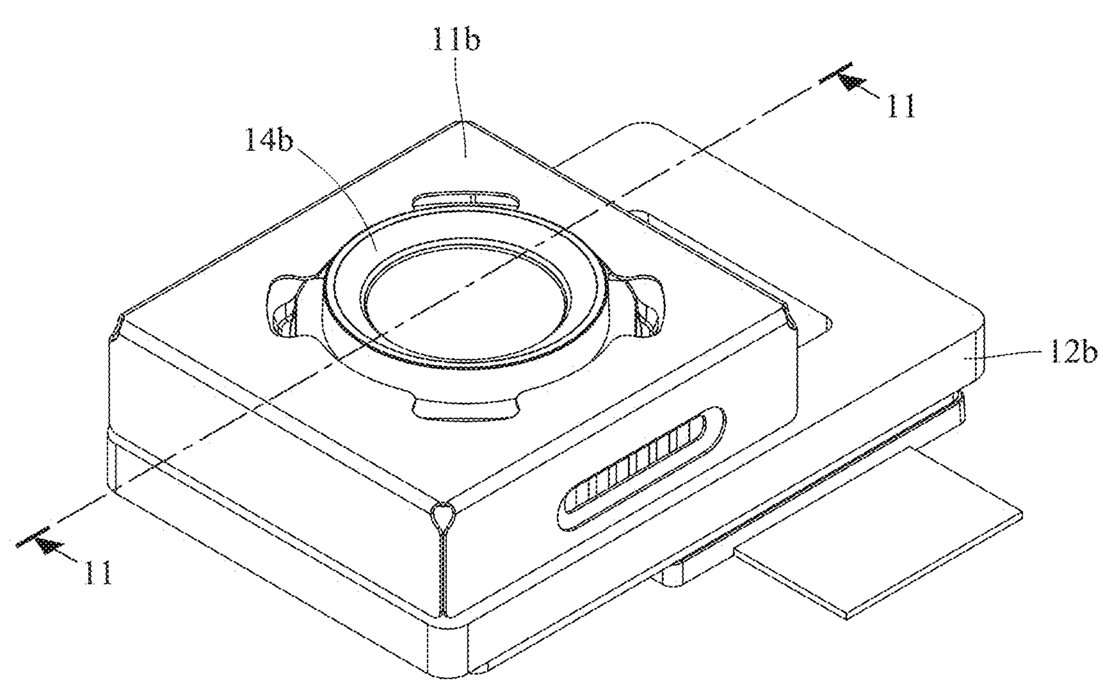
FIG. 8 is a perspective view of a camera module according to the 2nd embodiment of the present disclosure.
Figure 9:
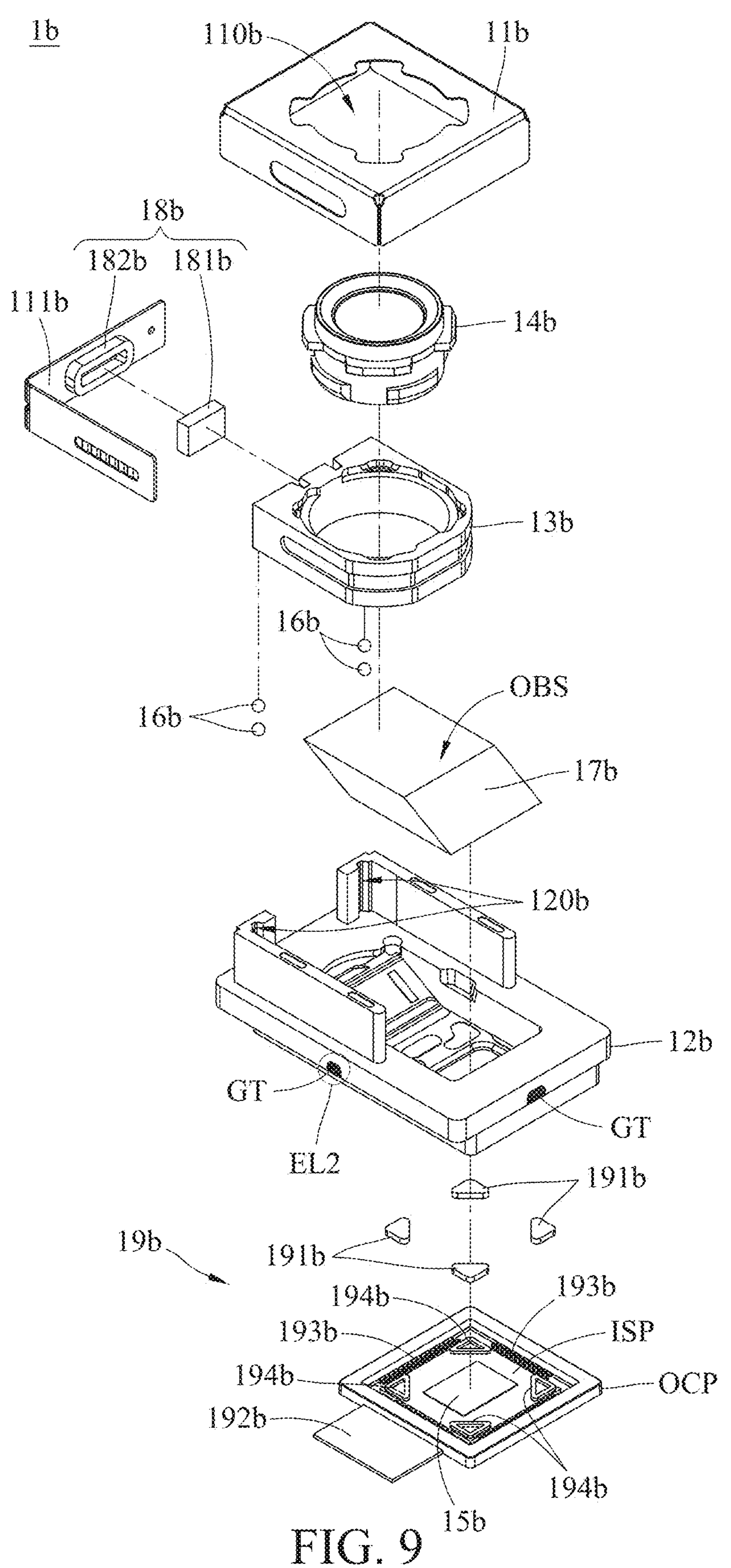
FIG. 9 is an exploded view of the camera module in FIG. 8.
Figure 10:
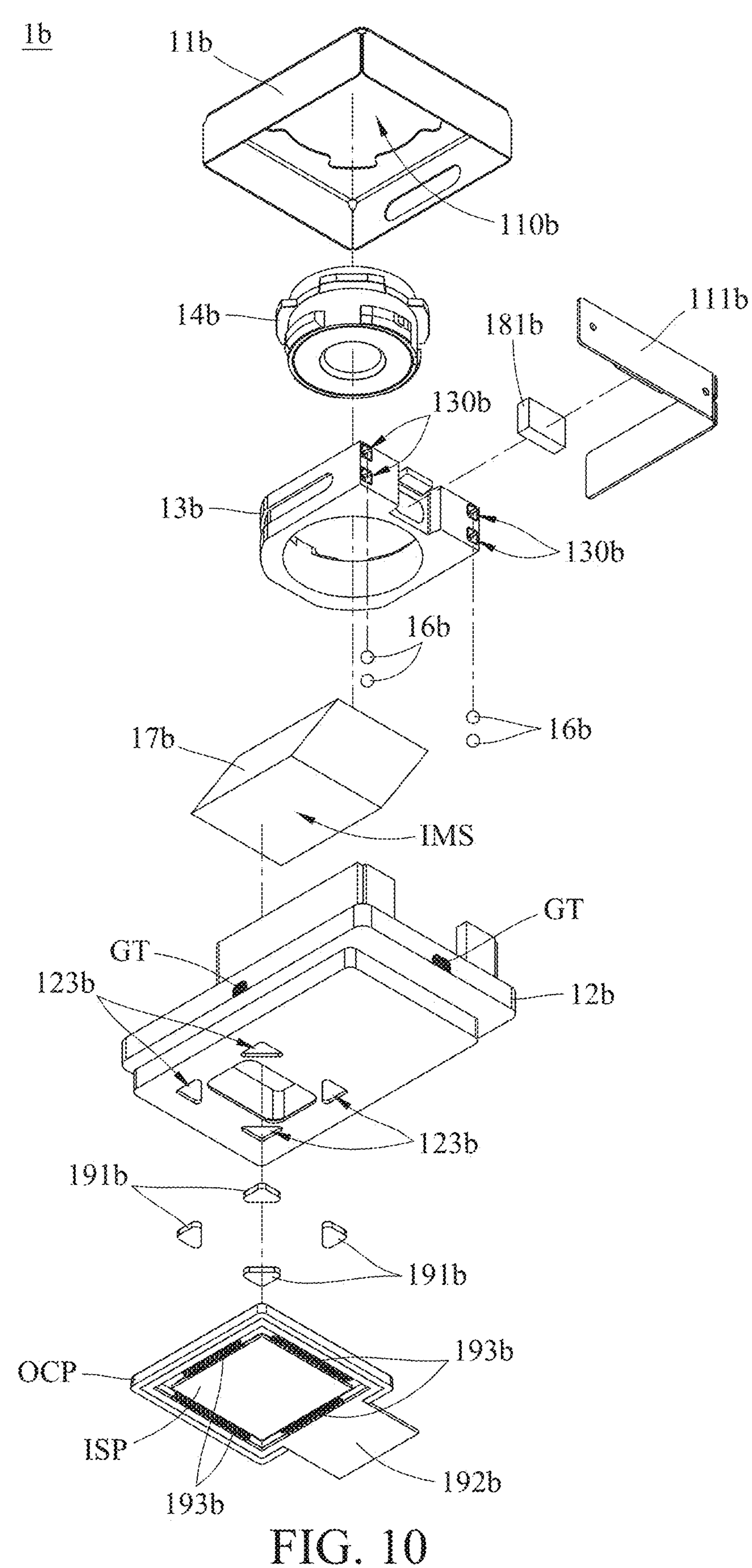
FIG. 10 is another exploded view of the camera module in FIG. 8.
Figure 11:
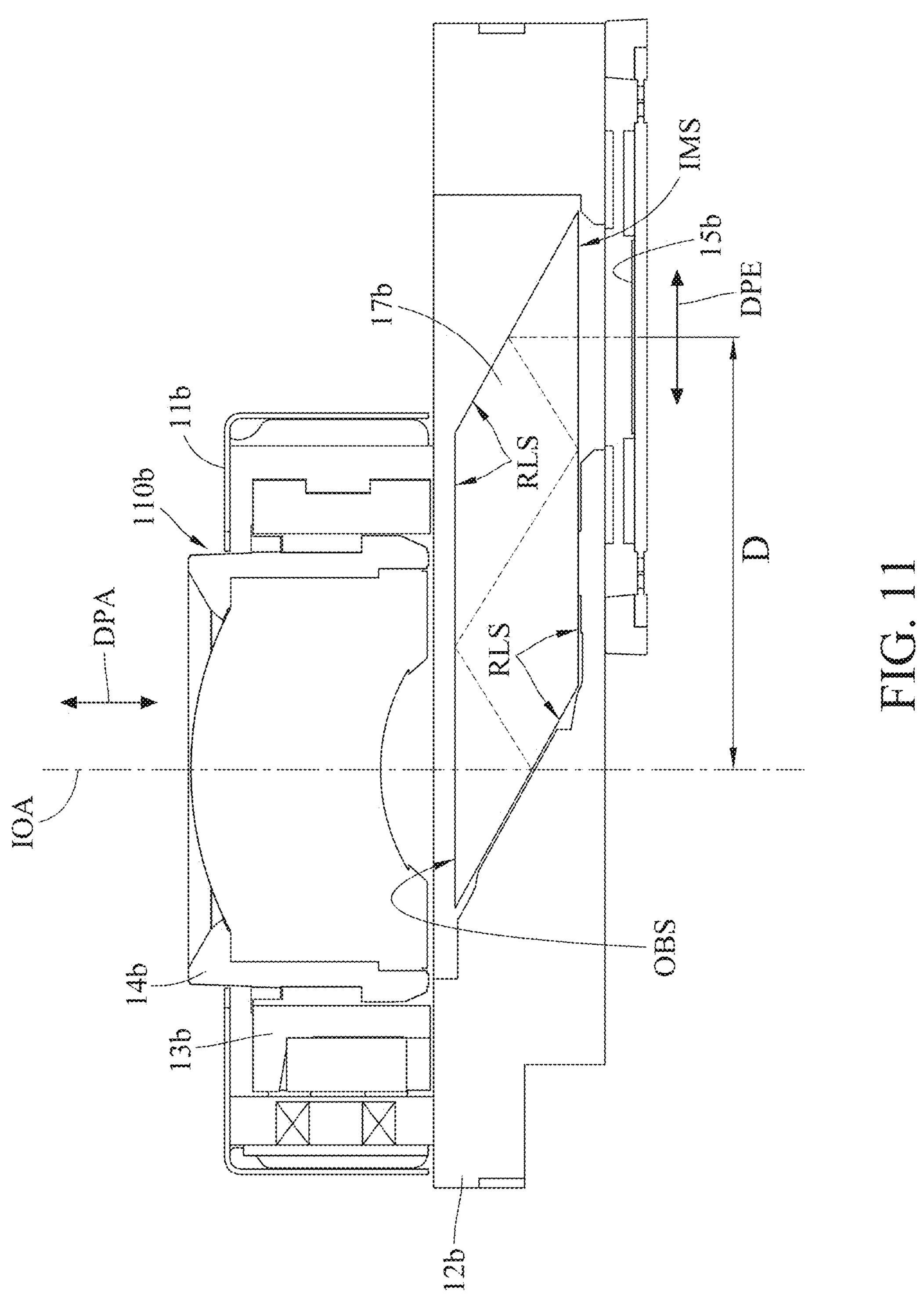
FIG. 11 is a cross-sectional view of the camera module along line 11-11 in FIG. 8.
Figure 12:
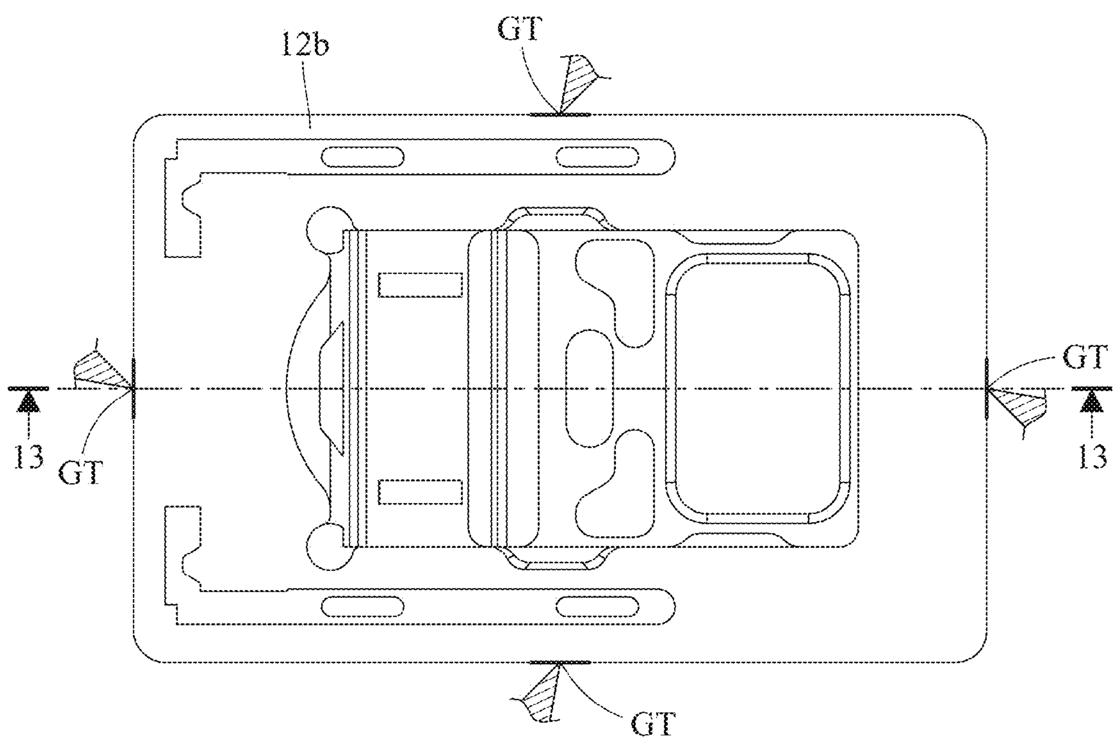
FIG. 12 is a top view of a fixed base of the camera module in FIG. 8.
Figure 13:
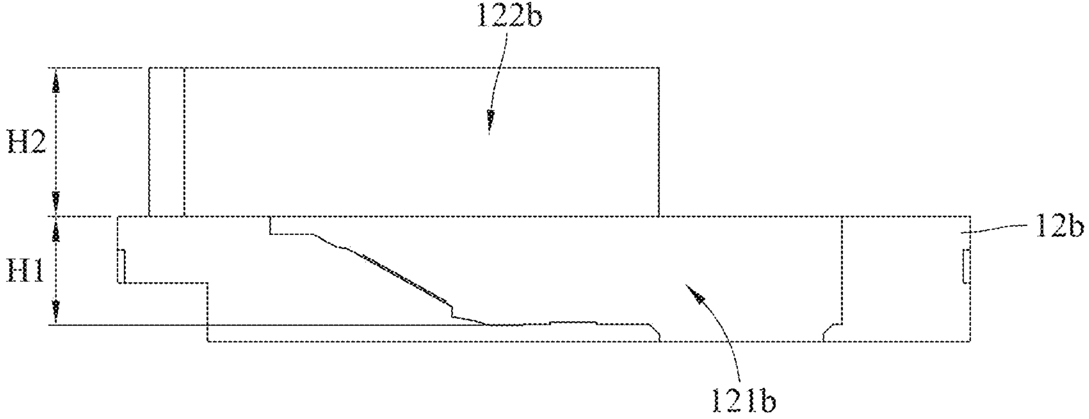
FIG. 13 is a cross-sectional view of the fixed base of the camera module along line 13-13 in FIG. 12.
Figure 14:
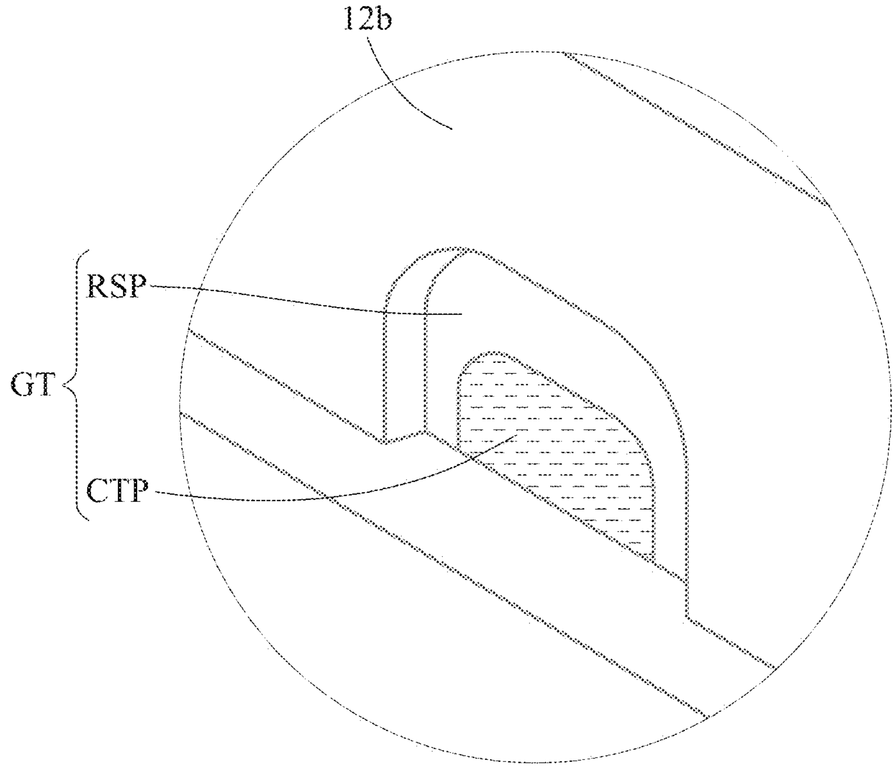
FIG. 14 is an enlarged view of region EL2 in FIG. 9.

FIG. 8 is a perspective view of a camera module according to the 2nd embodiment of the present disclosure, FIG. 9 is an exploded view of the camera module in FIG. 8, FIG. 10 is another exploded view of the camera module in FIG. 8, FIG. 11 is a cross-sectional view of the camera module along line 11-11 in FIG. 8, FIG. 12 is a top view of a fixed base of the camera module in FIG. 8, FIG. 13 is a cross-sectional view of the fixed base of the camera module along line 13-13 in FIG. 12, and FIG. 14 is an enlarged view of region EL2 in FIG. 9.

In this embodiment, a camera module **1*b* includes a casing 11*b*, a fixed base 12*b*, a movable carrier 13*b*, a lens system 14*b*, an image sensor 15*b*, four guiding elements 16*b*, a reflection element 17*b*, an auto focus driving device 18*b* and an image stabilization driving device 19*b***.

The casing **11*b* is disposed on the fixed base 12*b* and forms an accommodation space together with the fixed base 12*b*, and the fixed base 12*b* has a first accommodation portion 121*b* and a second accommodation portion 122*b*. The movable carrier 13*b* is located in the accommodation space and disposed in the second accommodation portion 122*b* of the fixed base 12*b*. The lens system 14*b* is fixed to the movable carrier 13*b*, and the lens system 14*b* is disposed through an opening 110*b* of the casing 11*b*. The image sensor 15*b* is disposed on an image surface of the lens system 14*b* and configured to receive optical image signal from the lens system 14*b***.

The guiding elements **16*b* are disposed between the fixed base 12*b* and the movable carrier 13*b*, and the guiding elements 16*b* provide a degree of freedom of movement of the movable carrier 13*b* relative to the fixed base 12*b*. In detail, the fixed base 12*b*** further has a guiding structure

120*b*, the movable carrier 13*b* has a guiding structure 130*b*, and the guiding structures 120*b* and 130*b* correspond to each other and are in physical contact with the guiding elements 16*b*. In this embodiment, the four guiding elements 16*b* are balls. The guiding structure 130*b* of the movable carrier 13*b* includes four accommodation recesses respectively accommodating the four guiding elements 16*b*, such that the relative position between the guiding elements 16*b* is fixed. The guiding structure 120*b* of the fixed base 12*b* includes two grooves, each of the grooves is in physical contact with two of the guiding elements 16*b*, and the guiding structure 120*b* defines a movement range of the movable carrier 13*b*. Through the collaboration among the guiding elements 16*b*, the guiding structure 120*b* of the fixed base 12*b* and the guiding structure 130*b* of the movable carrier 13*b*, the movable carrier 13*b* is movable relative to the fixed base 12*b* in a direction DPA parallel to an optical axis IOA of the lens system 14*b*.

The reflection element 17*b* is disposed in the first accommodation portion 121*b* of the fixed base 12*b*, and the fixed base 12*b* has no relative motion with respect to the reflection element 17*b*. The reflection element 17*b* has an object-side surface OBS corresponding to the lens system 14*b*, and the reflection element 17*b* has an image-side surface IMS corresponding to the image sensor 15*b*. Furthermore, the lens system 14*b*, the reflection element 17*b* and the image sensor 15*b* are arranged in sequence in the direction DPA parallel to the optical axis IOA of the lens system 14*b*. In this embodiment, the reflection element 17*b* has four reflection surfaces RLS configured to reflect an imaging light (as shown in FIG. 11) so as to be applicable to optical designs where the geometric space is reduced, which is favorable for the miniaturization of the camera module 1*b* and prevents mirror image signals. In this embodiment, the reflection element 17*b* can be a plastic reflection element or a glass reflection element.

The auto focus driving device 18*b* is configured to provide a driving force for auto focusing of the lens system 14*b*. In detail, the auto focus driving device 18*b* includes a first magnet element 181*b* and a first coil element 182*b*. The first magnet element 181*b* is disposed on the movable carrier 13*b*, and the first coil element 182*b* is disposed on a fixed plate 111*b* of the casing 11*b* and corresponds to the first magnet element 181*b*. Since the casing 11*b* is fixed to the fixed base 12*b*, the first coil element 182*b* disposed on the fixed plate 111*b* of the casing 11*b* is fixed on the fixed base 12*b* via the casing 11*b*; that is, the first coil element 182*b* has no relative motion with respect to the fixed base 12*b*. The first magnet element 181*b* disposed on the movable carrier 13*b* and the first coil element 182*b* are configured to interact with each other to produce an electromagnetic driving force (i.e., a Lorentz force) for driving the movable carrier 13*b* to move together with the first magnet element 181*b* relative to the fixed base 12*b*, and with the collaboration of the guiding elements 16*b*, the guiding structure 120*b* of the fixed base 12*b* and the guiding structure 130*b* of the movable carrier 13*b*, the movable carrier 13*b* and the lens system 14*b* disposed on the movable carrier 13*b* can be moved relative to the fixed base 12*b* in the direction DPA parallel to the optical axis IOA of the lens system 14*b* (as shown in FIG. 11) so as to achieve auto focus.

The image stabilization driving device 19*b* is configured to provide a driving force for image stabilization of the image sensor 15*b*. In detail, the image stabilization driving device 19*b* includes four second magnet elements 191*b*, a flexible printed circuit 192*b*, a plurality of elastic support elements 193*b* and four second coil elements 194*b*. The second magnet elements 191*b* is fixed to four magnet accommodation parts 123*b* of the fixed base 12*b*, and the magnet accommodation parts 123*b* are, for example, containers in a shape corresponding to the second magnet elements 191*b*. The flexible printed circuit 192*b* is disposed on the fixed base 12*b*. The flexible printed circuit 192*b* includes an inner substrate ISP and an outer substrate OCP surrounding the inner substrate ISP. The outer substrate OCP is attached to the fixed base 12*b*. The inner substrate ISP is movably and physically connected to the outer substrate OCP via the elastic support elements 193*b*, and the inner substrate ISP is also electrically connected to the outer substrate OCP. The second coil elements 194*b* and the image sensor 15*b* are disposed on the inner substrate ISP and movable relative to the outer substrate OCP via the elastic support elements 193*b*. The second magnet elements 191*b* respectively correspond to four corners of the image sensor 15*b*, and the second coil elements 194*b* and the second magnet elements 191*b* are disposed corresponding to each other. Therefore, the second coil elements 194*b* and the second magnet elements 191*b* can interact with each other to produce an electromagnetic driving force for driving the inner substrate ISP together with the image sensor 15*b* to move relative to the fixed base 12*b*. In this embodiment, the image sensor 15*b* is movable relative to the fixed base 12*b* in a direction DPE perpendicular to the optical axis IOA of the lens system 14*b* (as shown in FIG. 11) so as to achieve image stabilization.

In this embodiment, the second coil elements 194*b* of the image stabilization driving device 19*b* and the first magnet element 181*b* of the auto focus driving device 18*b* are movable relative to the fixed base 12*b*, and through such driving configuration, the interferences on control signals can be reduced.

In this embodiment, the lens system 14*b*, the reflection element 17*b* and the image sensor 15*b* are arranged in sequence in the direction DPA parallel to the optical axis IOA of the lens system 14*b*, which is an order of arrangement for easier assembling, thereby improving automation efficiency.

In this embodiment, the fixed base 12*b* is formed by injection molding process and has four gate traces GT. The four gate traces GT are respectively disposed on the middle of each of four sides of the fixed base 12*b* for achieving better molding efficiency. In this embodiment, the fixed base 12*b* may include a black plastic material. As shown in FIG. 14, each of the gate traces GT includes a recessed surface portion RSP and a cutting trace portion CTP, but the present disclosure is not limited thereto.

When a height of the first accommodation portion 121*b* of the fixed base 12*b* in the direction DPA parallel to the optical axis IOA is H1, and a height of the second accommodation portion 122*b* of the fixed base 12*b* in the direction DPA parallel to the optical axis IOA is H2, the following conditions are satisfied: H1=2.78 mm; H2=3.8 mm; and H1/H2=0.73.

When a maximum field of view of the lens system 14*b* is FOV, the following condition is satisfied: FOV=10.1 degrees.

When a focal length of the lens system 14*b* is EFL, the following condition is satisfied: EFL=28.2 mm.

When a distance between a center of the image sensor 15*b* and the optical axis IOA of the lens system 14*b* is D, the following condition is satisfied: D=8.066 mm.

3rd Embodiment

Figure 15:
FIG. 15 is a perspective view of a camera module according to the 3rd embodiment of the present disclosure.
Figure 15:
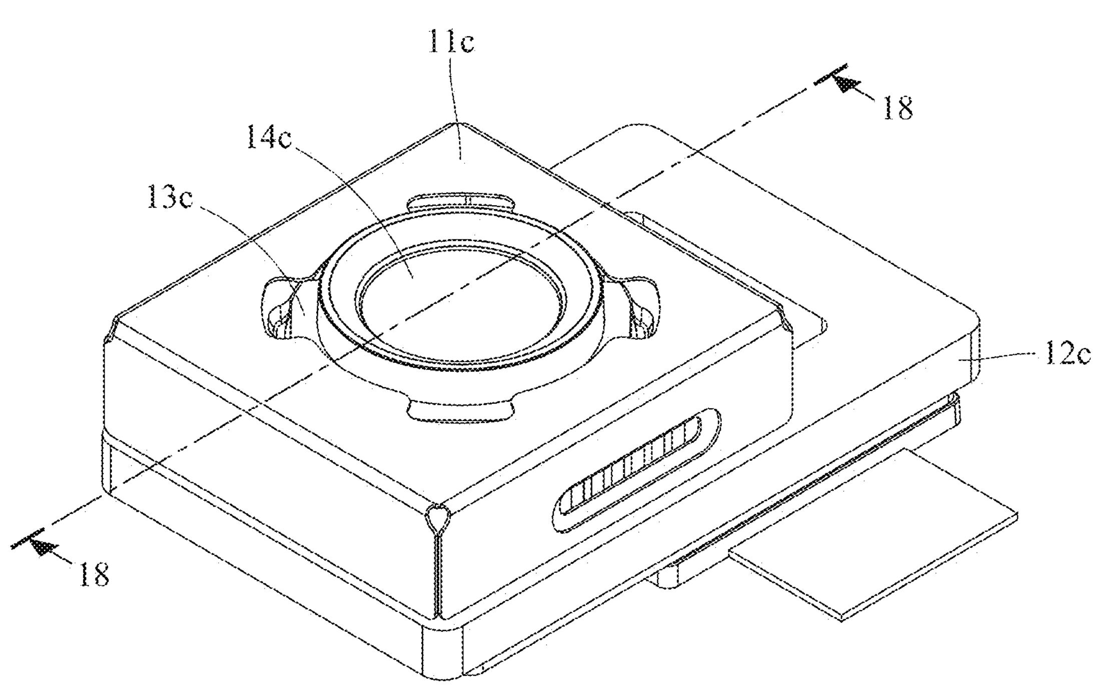
Figure 16:
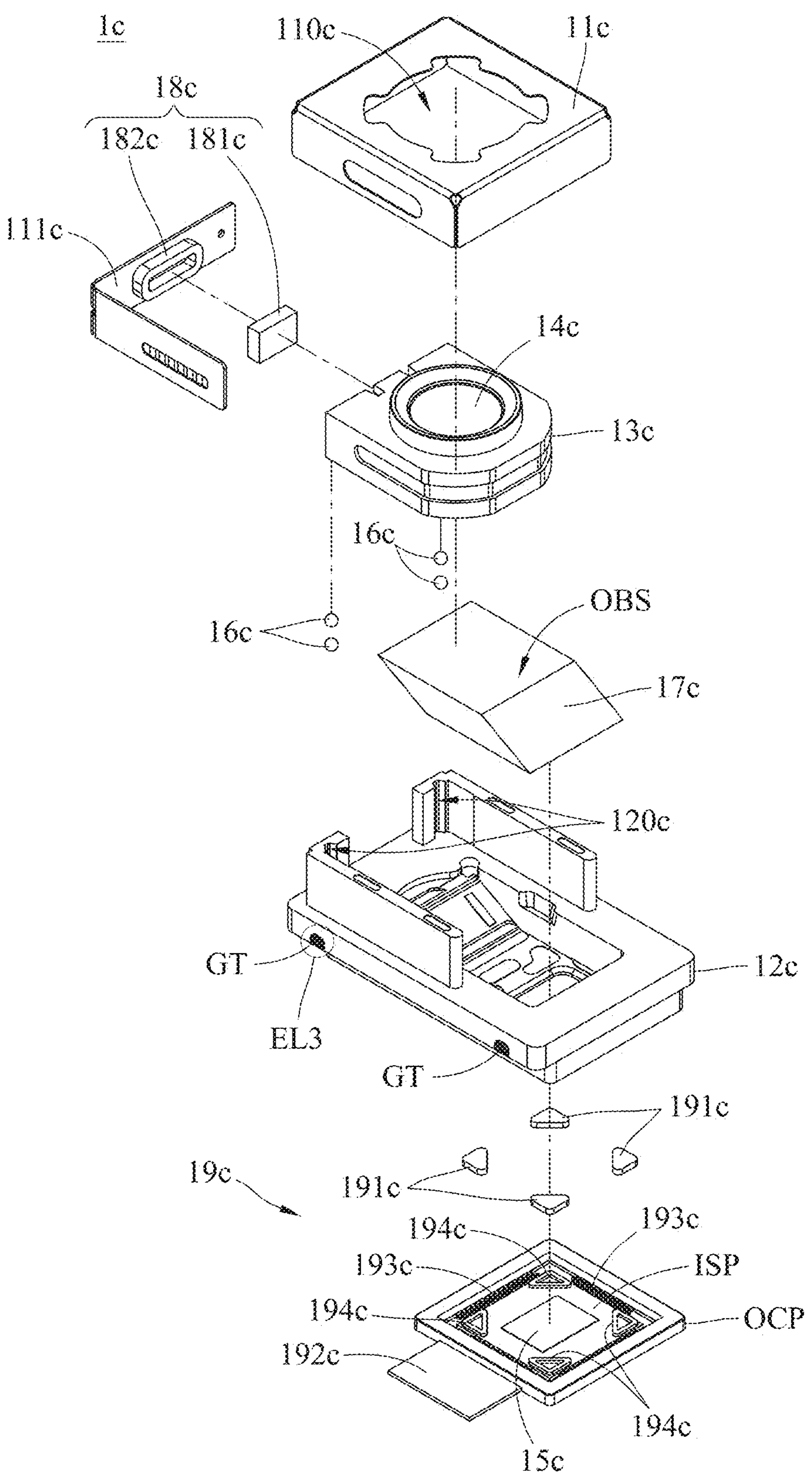
FIG. 16 is an exploded view of the camera module in FIG. 15.
Figure 17:
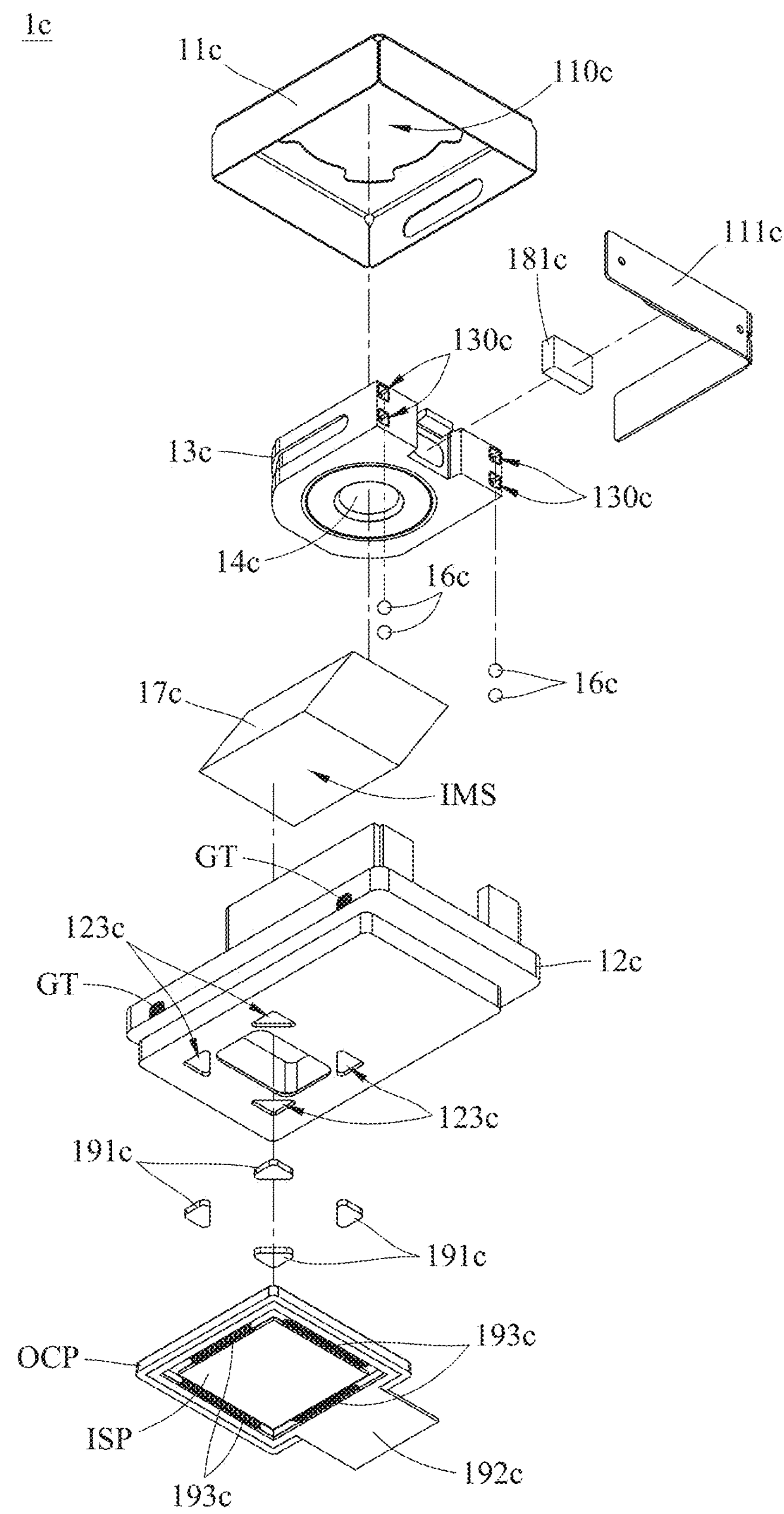
FIG. 17 is another exploded view of the camera module in FIG. 15.
Figure 18:
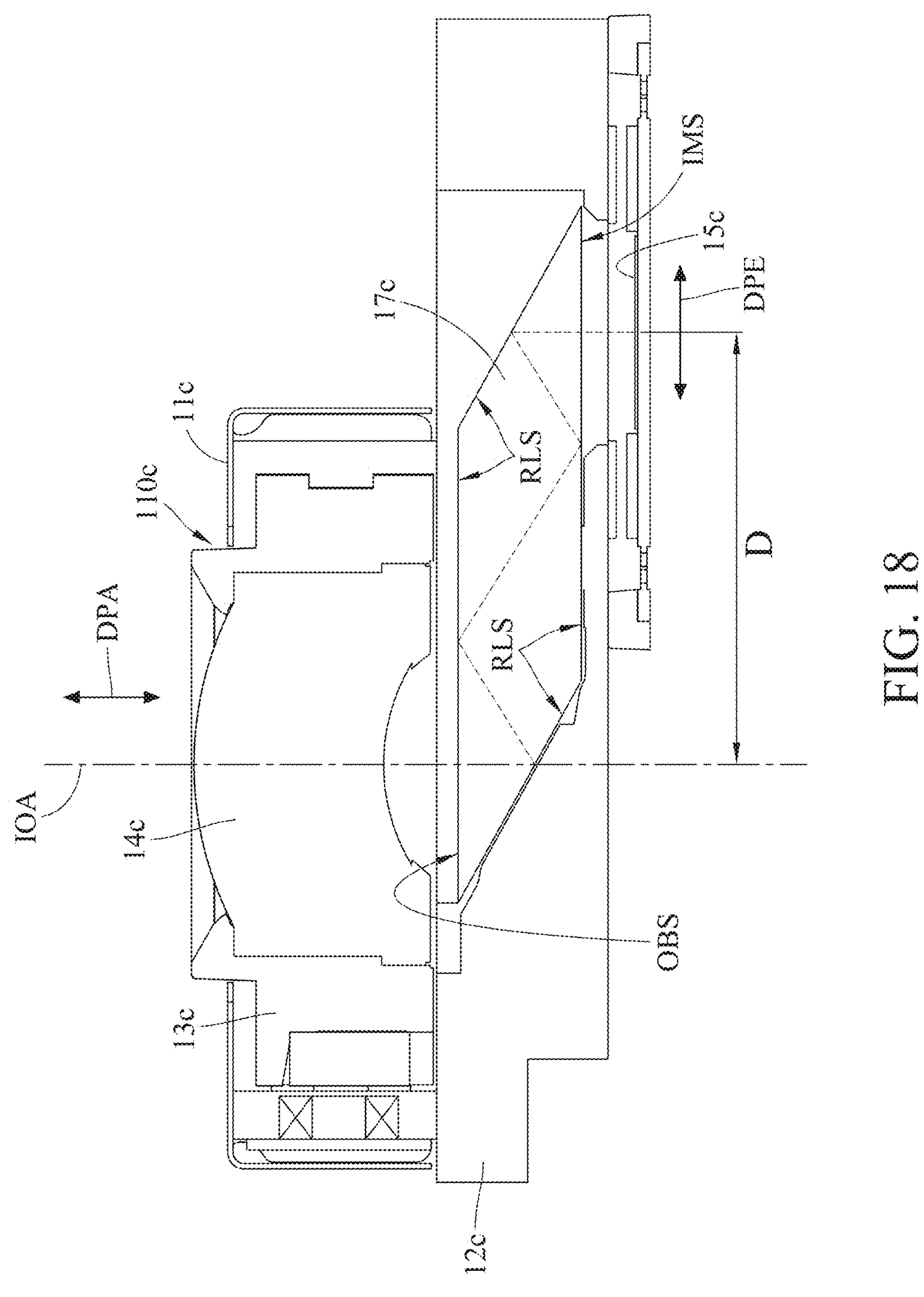
FIG. 18 is a cross-sectional view of the camera module along line 18-18 in FIG. 15.
Figure 19:
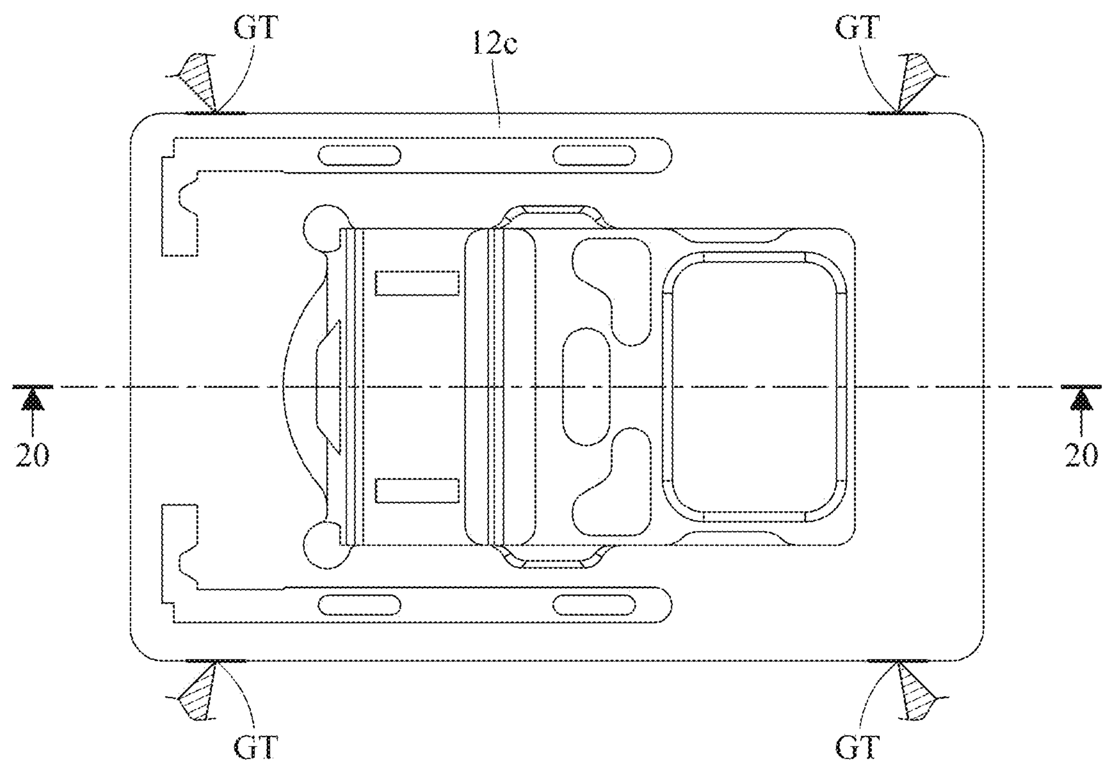
FIG. 19 is a top view of a fixed base of the camera module in FIG. 15.
Figure 20:
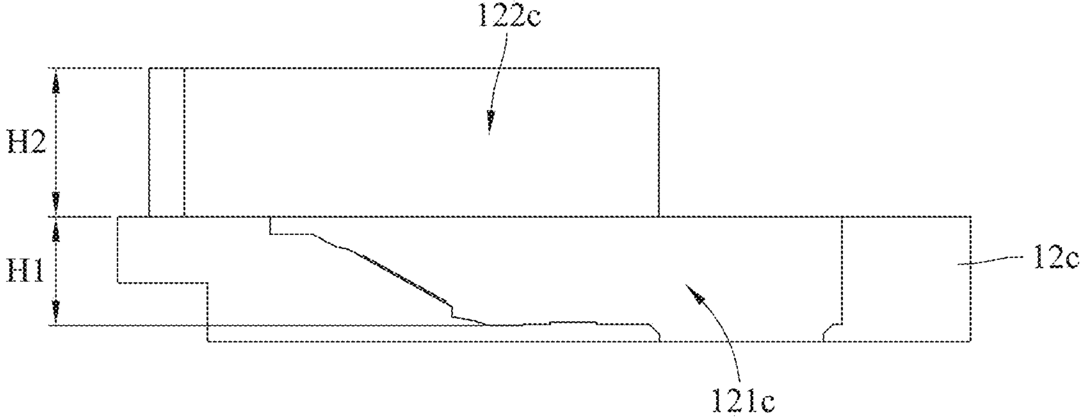
FIG. 20 is a cross-sectional view of the fixed base of the camera module along line 20-20 in FIG. 19.
Figure 21:
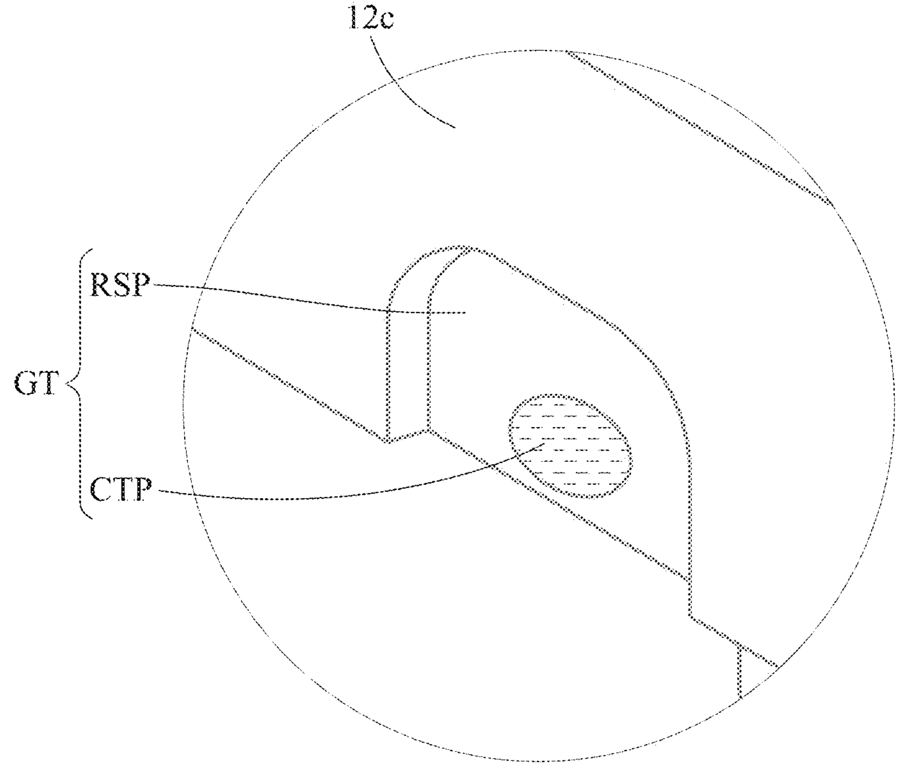
FIG. 21 is an enlarged view of region EL3 in FIG. 16.

FIG. 15 is a perspective view of a camera module according to the 3rd embodiment of the present disclosure, FIG. 16 is an exploded view of the camera module in FIG. 15, FIG. 17 is another exploded view of the camera module in FIG. 15, FIG. 18 is a cross-sectional view of the camera module along line 18-18 in FIG. 15, FIG. 19 is a top view of a fixed base of the camera module in FIG. 15, FIG. 20 is a cross-sectional view of the fixed base of the camera module along line 20-20 in FIG. 19, and FIG. 21 is an enlarged view of region EL3 in FIG. 16.

In this embodiment, a camera module 1*c* includes a casing 11*c*, a fixed base 12*c*, a movable carrier 13*c*, a lens system 14*c*, an image sensor 15*c*, four guiding elements 16*c*, a reflection element 17*c*, an auto focus driving device 18*c* and an image stabilization driving device 19*c*.

The casing 11*c* is disposed on the fixed base 12*c* and forms an accommodation space together with the fixed base 12*c*, and the fixed base 12*c* has a first accommodation portion 121*c* and a second accommodation portion 122*c*. The movable carrier 13*c* is located in the accommodation space and disposed in the second accommodation portion 122*c* of the fixed base 12*c*. The image sensor 15*c* is disposed on an image surface of the lens system 14*c* and configured to receive optical image signal from the lens system 14*c*. In this embodiment, the movable carrier 13*c* is a lens holder, and the lens system 14*c* is an imaging lens assembly directly disposed in the movable carrier 13*c*. As shown in FIG. 18, the movable carrier 13*c* and the lens system 14*c* are disposed through an opening 110*c* of the casing 11*c*.

The guiding elements 16*c* are disposed between the fixed base 12*c* and the movable carrier 13*c*, and the guiding elements 16*c* provide a degree of freedom of movement of the movable carrier 13*c* relative to the fixed base 12*c*. In detail, the fixed base 12*c* further has a guiding structure 120*c*, the movable carrier 13*c* has a guiding structure 130*c*, and the guiding structures 120*c* and 130*c* correspond to each other and are in physical contact with the guiding elements 16*c*. In this embodiment, the four guiding elements 16*c* are balls. The guiding structure 130*c* of the movable carrier 13*c* includes four accommodation recesses respectively accommodating the four guiding elements 16*c*, such that the relative position between the guiding elements 16*c* is fixed. The guiding structure 120*c* of the fixed base 12*c* includes two grooves, each of the grooves is in physical contact with two of the guiding elements 16*c*, and the guiding structure 120*c* defines a movement range of the movable carrier 13*c*. Through the collaboration among the guiding elements 16*c*, the guiding structure 120*c* of the fixed base 12*c* and the guiding structure 130*c* of the movable carrier 13*c*, the movable carrier 13*c* is movable relative to the fixed base 12*c* in a direction DPA parallel to an optical axis IOA of the lens system 14*c*.

The reflection element 17*c* is disposed in the first accommodation portion 121*c* of the fixed base 12*c*, and the fixed base 12*c* has no relative motion with respect to the reflection element 17*c*. The reflection element 17*c* has an object-side surface OBS corresponding to the lens system 14*c*, and the reflection element 17*c* has an image-side surface IMS corresponding to the image sensor 15*c*. Furthermore, the lens system 14*c*, the reflection element 17*c* and the image sensor 15*c* are arranged in sequence in the direction DPA parallel to the optical axis IOA of the lens system 14*c*. In this embodiment, the reflection element 17*c* has four reflection surfaces RLS configured to reflect an imaging light (as shown in FIG. 18) so as to be applicable to optical designs where the geometric space is reduced, which is favorable for the miniaturization of the camera module 1*c* and prevent mirror image signals. In this embodiment, the reflection element 17*c* can be a plastic reflection element or a glass reflection element.

The auto focus driving device 18*c* is configured to provide a driving force for auto focusing of the lens system 14*c*. In detail, the auto focus driving device 18*c* includes a first magnet element 181*c* and a first coil element 182*c*. The first magnet element 181*c* is disposed on the movable carrier 13*c*, and the first coil element 182*c* is disposed on a fixed plate 111*c* of the casing 11*c* and corresponds to the first magnet element 181*c*. Since the casing 11*c* is fixed to the fixed base 12*c*, the first coil element 182*c* disposed on the fixed plate 111*c* of the casing 11*c* is fixed on the fixed base 12*c* via the casing 11*c*; that is, the first coil element 182*c* has no relative motion with respect to the fixed base 12*c*. The first magnet element 181*c* disposed on the movable carrier 13*c* and the first coil element 182*c* are configured to interact with each other to produce an electromagnetic driving force (i.e., a Lorentz force) for driving the movable carrier 13*c* to move together with the first magnet element 181*c* relative to the fixed base 12*c*, and with the collaboration of the guiding elements 16*c*, the guiding structure 120*c* of the fixed base 12*c* and the guiding structure 130*c* of the movable carrier 13*c*, the movable carrier 13*c* and the lens system 14*c* disposed on the movable carrier 13*c* can be moved relative to the fixed base 12*c* in the direction DPA parallel to the optical axis IOA of the lens system 14*c* (as shown in FIG. 18) so as to achieve auto focus.

The image stabilization driving device 19*c* is configured to provide a driving force for image stabilization of the image sensor 15*c*. In detail, the image stabilization driving device 19*c* includes four second magnet elements 191*c*, a flexible printed circuit 192*c*, a plurality of elastic support elements 193*c* and four second coil elements 194*c*. The second magnet elements 191*c* is fixed to four magnet accommodation parts 123*c* of the fixed base 12*c*, and the magnet accommodation parts 123*c* are, for example, containers in a shape corresponding to the second magnet elements 191*c*. The flexible printed circuit 192*c* is disposed on the fixed base 12*c*. The flexible printed circuit 192*c* includes an inner substrate ISP and an outer substrate OCP surrounding the inner substrate ISP. The outer substrate OCP is attached to the fixed base 12*c*. The inner substrate ISP is movably and physically connected to the outer substrate OCP via the elastic support elements 193*c*, and the inner substrate ISP is also electrically connected to the outer substrate OCP. The second coil elements 194*c* and the image sensor 15*c* are disposed on the inner substrate ISP and movable relative to the outer substrate OCP via the elastic support elements 193*c*. The second magnet elements 191*c* respectively correspond to four corners of the image sensor 15*c*, and the second coil elements 194*c* and the second magnet elements 191*c* are disposed corresponding to each other. Therefore, the second coil elements 194*c* and the second magnet elements 191*c* can interact with each other to produce an electromagnetic driving force for driving the inner substrate ISP together with the image sensor 15*c* to move relative to the fixed base 12*c*. In this embodiment, the image sensor 15*c* is movable relative to the fixed base 12*c* in a direction DPE perpendicular to the optical axis IOA of the lens system 14*c* (as shown in FIG. 18) so as to achieve image stabilization.

In this embodiment, the second coil elements 194*c* of the image stabilization driving device 19*c* and the first magnet element 181*c* of the auto focus driving device 18*c* are movable relative to the fixed base 12*c*, and through such driving configuration, the interferences on control signals can be reduced.

In this embodiment, the lens system 14*c*, the reflection element 17*c* and the image sensor 15*c* are arranged in sequence in the direction DPA parallel to the optical axis IOA of the lens system 14*c*, which is an order of arrangement for easier assembling, thereby improving automation efficiency.

In this embodiment, the fixed base 12*c* is formed by injection molding process and has four gate traces GT. The four gate traces GT are respectively disposed on corners of two sides of the fixed base 12*c* for achieving better molding efficiency. In this embodiment, the fixed base 12*c* may include a black plastic material. As shown in FIG. 21, each of the gate traces GT includes a recessed surface portion RSP and a cutting trace portion CTP, but the present disclosure is not limited thereto.

When a height of the first accommodation portion 121*c* of the fixed base 12*c* in the direction DPA parallel to the optical axis IOA is H1, and a height of the second accommodation portion 122*c* of the fixed base 12*c* in the direction DPA parallel to the optical axis IOA is H2, the following conditions are satisfied: H1=2.78 mm; H2=3.8 mm; and H1/H2=0.73.

When a maximum field of view of the lens system 14*c* is FOV, the following condition is satisfied: FOV=20.3 degrees.

When a focal length of the lens system 14*c* is EFL, the following condition is satisfied: EFL=17.0 mm.

When a distance between a center of the image sensor 15*c* and the optical axis IOA of the lens system 14*c* is D, the following condition is satisfied: D=8.066 mm.

4th Embodiment

Figure 22:
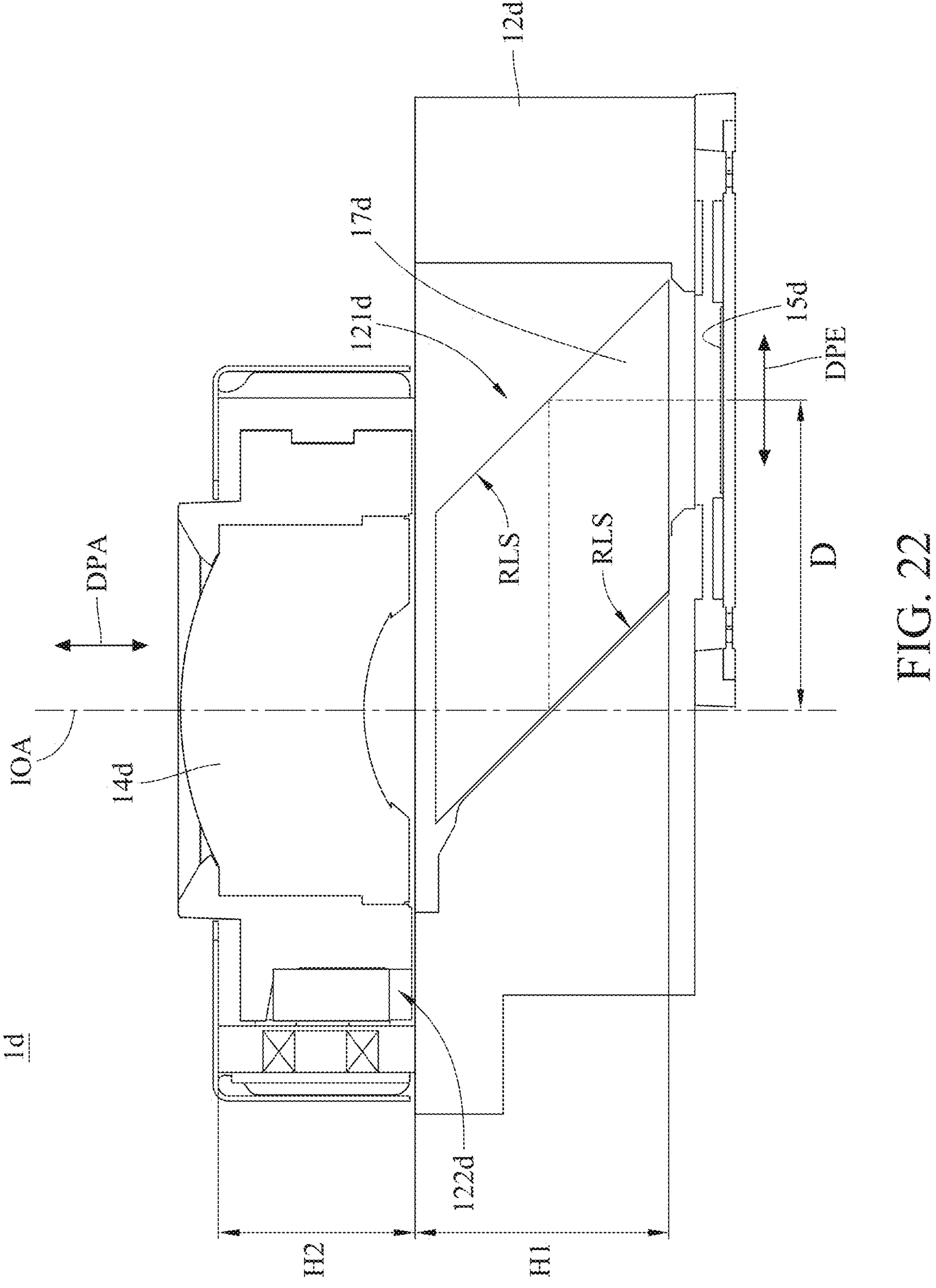
FIG. 22 is a cross-sectional view of a camera module according to the 4th embodiment of the present disclosure.

Please refer to FIG. 22, which is a cross-sectional view of a camera module according to the 4th embodiment of the present disclosure.

In this embodiment, a camera module 1*d* is provided. The camera module 1*d* has a configuration similar to that of the camera module 1*c* as disclosed in the 3rd embodiment and they are different from each other in that in this embodiment, the camera module 1*d* includes a reflection element 17*d* having two reflection surfaces RLS, and a first accommodation portion 121*d* of a fixed base 12*d* configured to accommodate the reflection element 17*d* has a different height in a direction DPA parallel to an optical axis IOA of a lens system 14*d*. In addition, in this embodiment, the camera module 1*d* has the following features that are different from that of the camera module 1*c* as disclosed in the 3rd embodiment.

When a height of the first accommodation portion 121*d* of the fixed base 12*d* in the direction DPA parallel to the optical axis IOA is H1, and a height of a second accommodation portion 122*d* of the fixed base 12*d* in the direction DPA parallel to the optical axis IOA is H2, the following conditions are satisfied: H1=4.9 mm; H2=3.8 mm; and H1/H2=1.29.

When a maximum field of view of the lens system 14*d* is FOV, the following condition is satisfied: FOV=19.5 degrees.

When a focal length of the lens system 14*d* is EFL, the following condition is satisfied: EFL=14.4 mm.

When a distance between a center of an image sensor 15*d* and the optical axis IOA of the lens system 14*d* is D, the following condition is satisfied: D=5.995 mm.

The present disclosure is not limited to the number of reflection element as described in the above embodiments. In other embodiments, a camera module may include two or more reflection elements.

5th Embodiment

Figure 23:
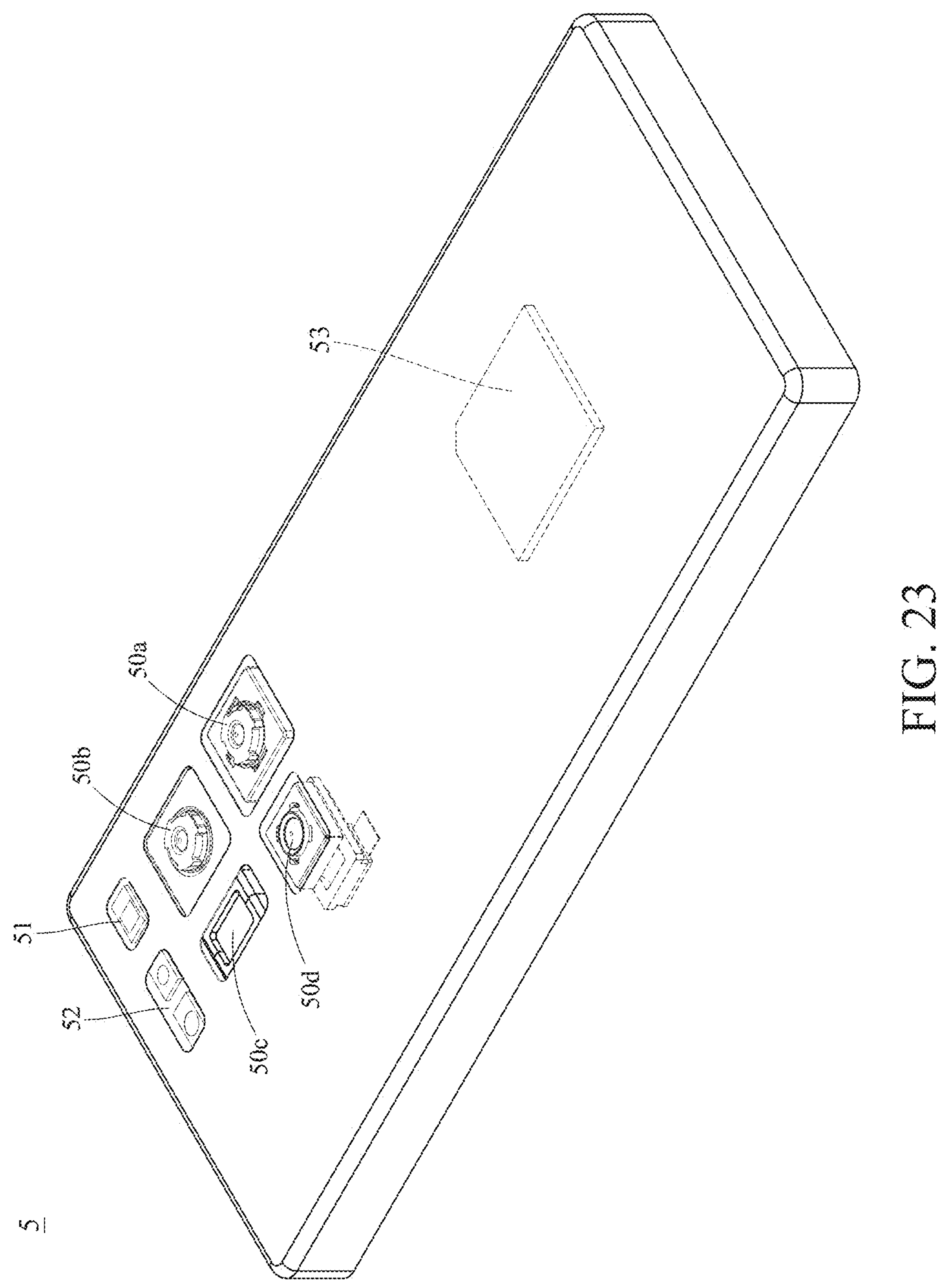
FIG. 23 is one perspective view of an electronic device according to the 5th embodiment of the present disclosure.
Figure 24:
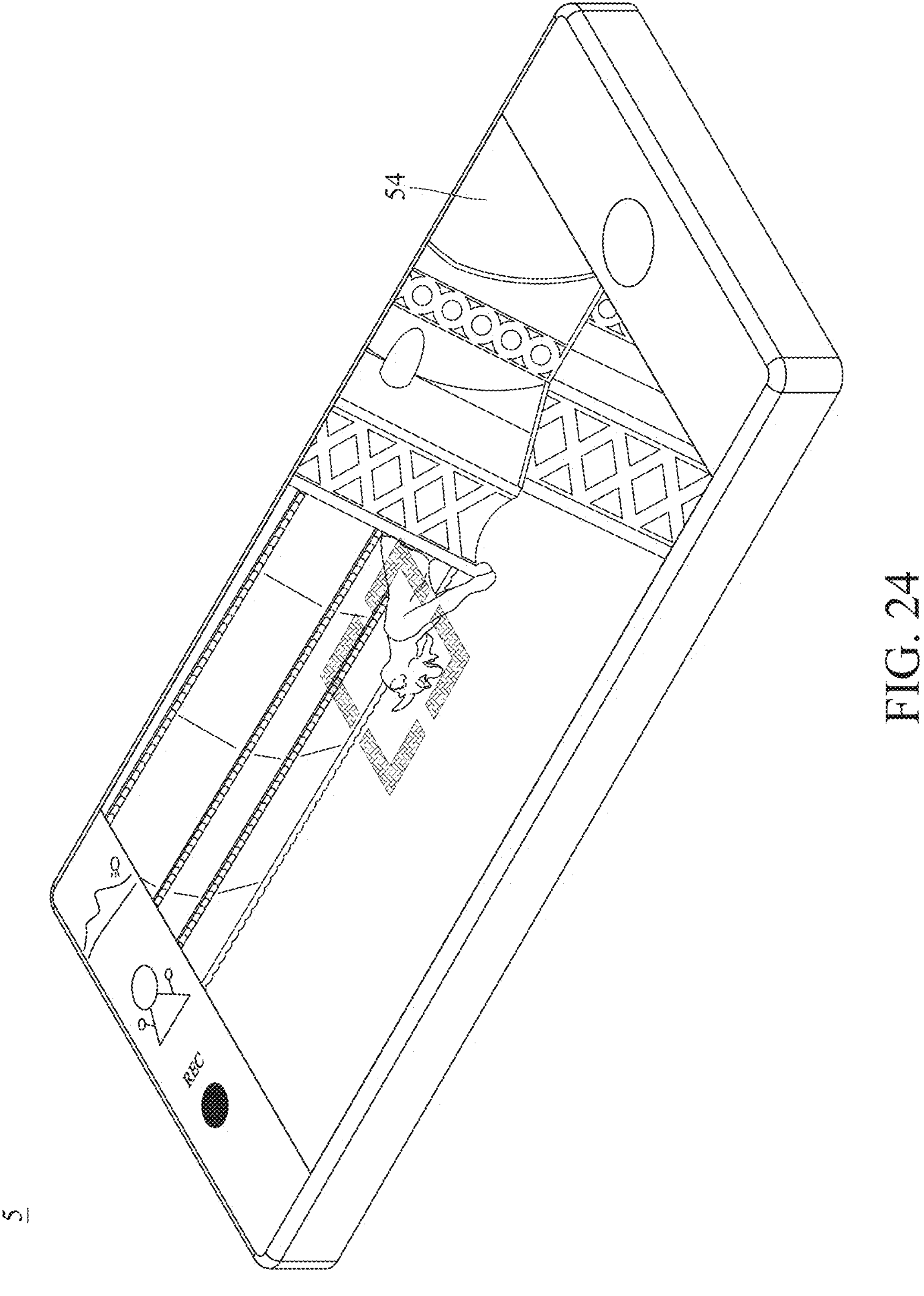
FIG. 24 is another perspective view of the electronic device in FIG. 23.

Please refer to FIG. 23 and FIG. 24. FIG. 23 is one perspective view of an electronic device according to the 5th embodiment of the present disclosure, and FIG. 24 is another perspective view of the electronic device in FIG. 23.

In this embodiment, the electronic device 5 is a smartphone including a plurality of image capturing units, a flash module 51, a focus assist module 52, an image signal processor 53, a display module (user interface) 54 and an image software processor (not shown).

The image capturing units include an ultra-wide-angle image capturing unit 50*a*, a high pixel image capturing unit 50*b*, a telephoto image capturing unit 50*c* and a telephoto image capturing unit 50*d*. Moreover, the telephoto image capturing unit 50*d* is the camera module 1 as disclosed in the 1st embodiment, but the present disclosure is not limited thereto. The telephoto image capturing unit 50*d* can be one of the other camera modules of the aforementioned embodiments. Furthermore, in addition to the telephoto image capturing unit 50*d*, at least one of the image capturing units 50*a*, 50*b* and 50*c* can be one of the camera modules of the aforementioned embodiments.

Figure 25:
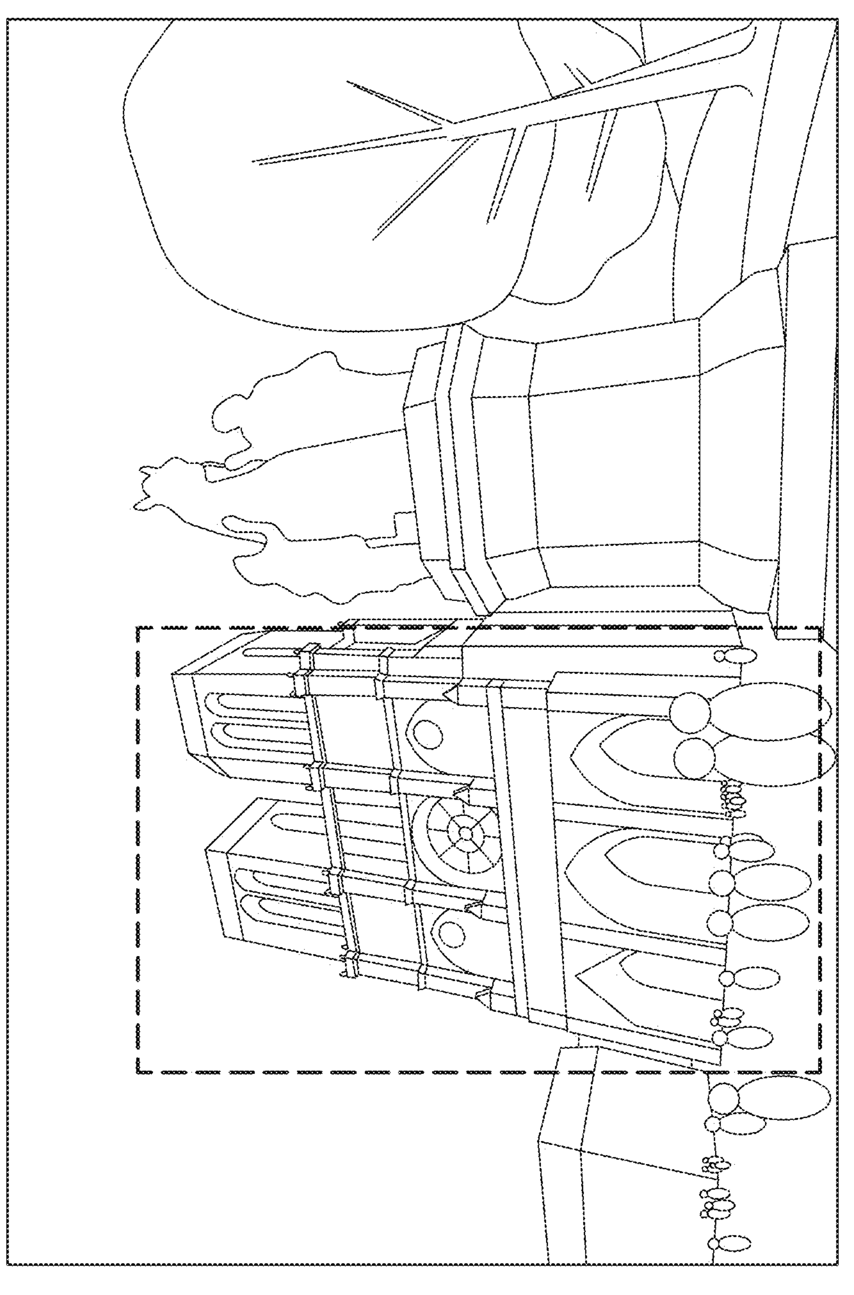
FIG. 25 is an image captured by an ultra-wide-angle camera module.

The image captured by the ultra-wide-angle image capturing unit 50*a* enjoys a feature of multiple imaged objects. FIG. 25 is an image captured by the ultra-wide-angle image capturing unit 50*a*.

Figure 26:
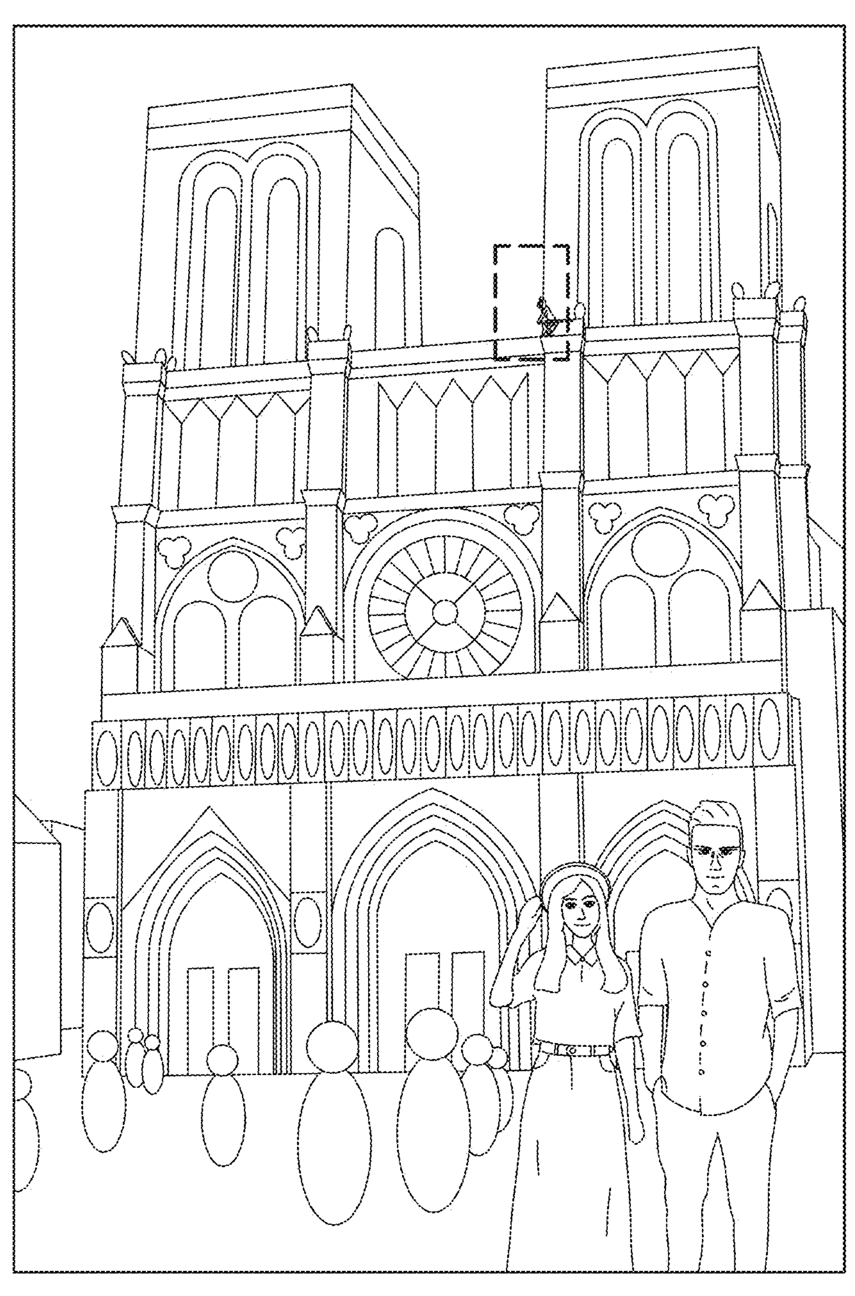
FIG. 26 is an image captured by a high pixel camera module.

The image captured by the high pixel image capturing unit 50*b* enjoys a feature of high resolution and less distortion, and the high pixel image capturing unit 50*b* can capture part of the image in FIG. 25. FIG. 26 is an image captured by the high pixel image capturing unit 50*b*.

Figure 27:
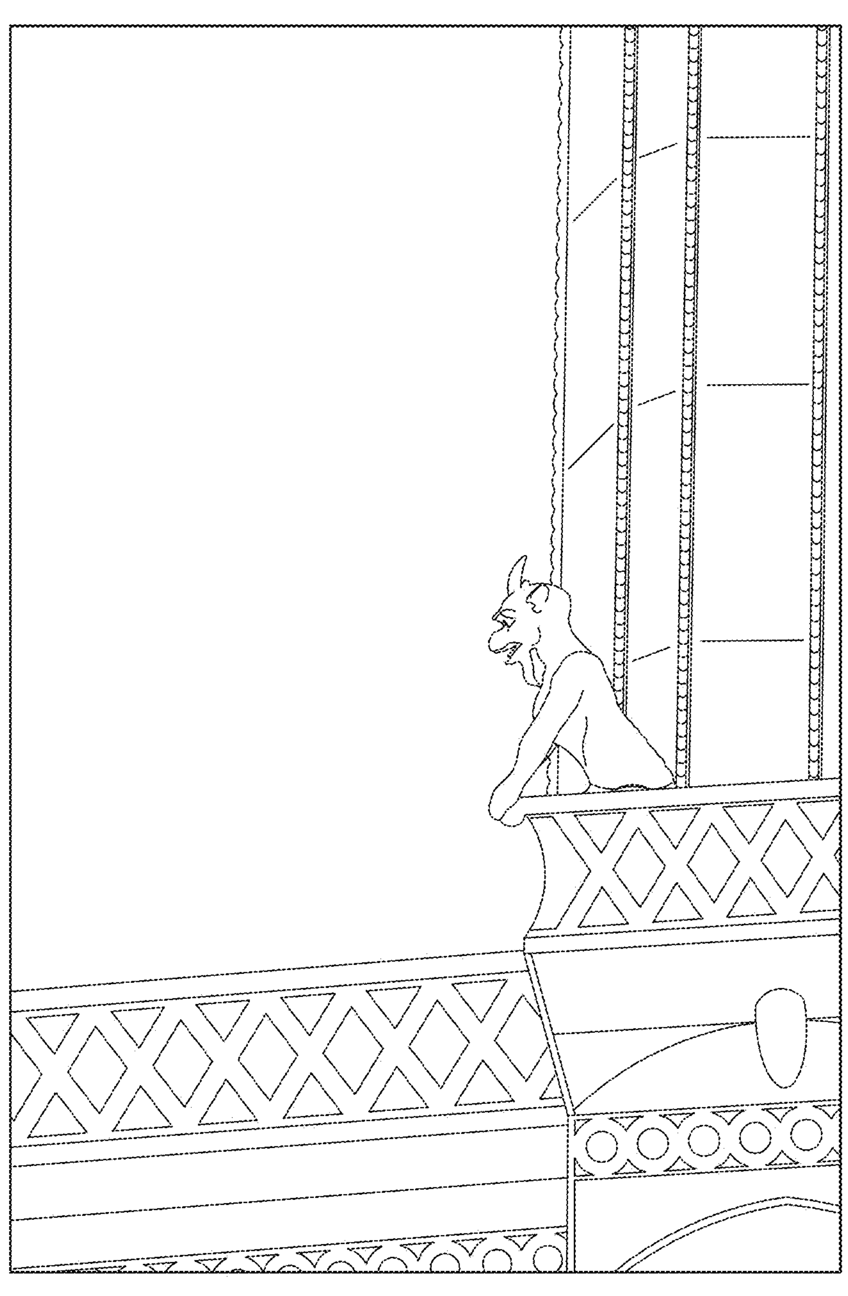
FIG. 27 is an image captured by a telephoto camera module.

The image captured by the telephoto image capturing unit 50*c* and the telephoto image capturing unit 50*d* enjoys a feature of high optical magnification, and the telephoto image capturing unit 50*c* or the telephoto image capturing unit 50*d* can capture part of the image in FIG. 26. FIG. 27 is an image captured by the telephoto image capturing unit 50*c* or the telephoto image capturing unit 50*d*. The maximum field of view of the image capturing unit corresponds to the field of view in FIG. 27.

When a user captures images of an object, the light rays converge in the ultra-wide-angle image capturing unit 50*a*, the high pixel image capturing unit 50*b*, the telephoto image capturing unit 50*c* or the telephoto image capturing unit 50*d* to generate images, and the flash module 51 is activated for light supplement. The focus assist module 52 detects the object distance of the imaged object to achieve fast auto focusing. The image signal processor 53 is configured to optimize the captured image to improve image quality and provided zooming function. The light beam emitted from the focus assist module 52 can be either conventional infrared or laser. The display module 54 can include a touch screen, and the user is able to interact with the display module 54 to adjust the angle of view and switch between different image capturing units, and the image software processor having multiple functions to capture images and complete image processing. Alternatively, the user may capture images via a physical button. The image processed by the image software processor can be displayed on the display module 54.

6th Embodiment

Figure 28:
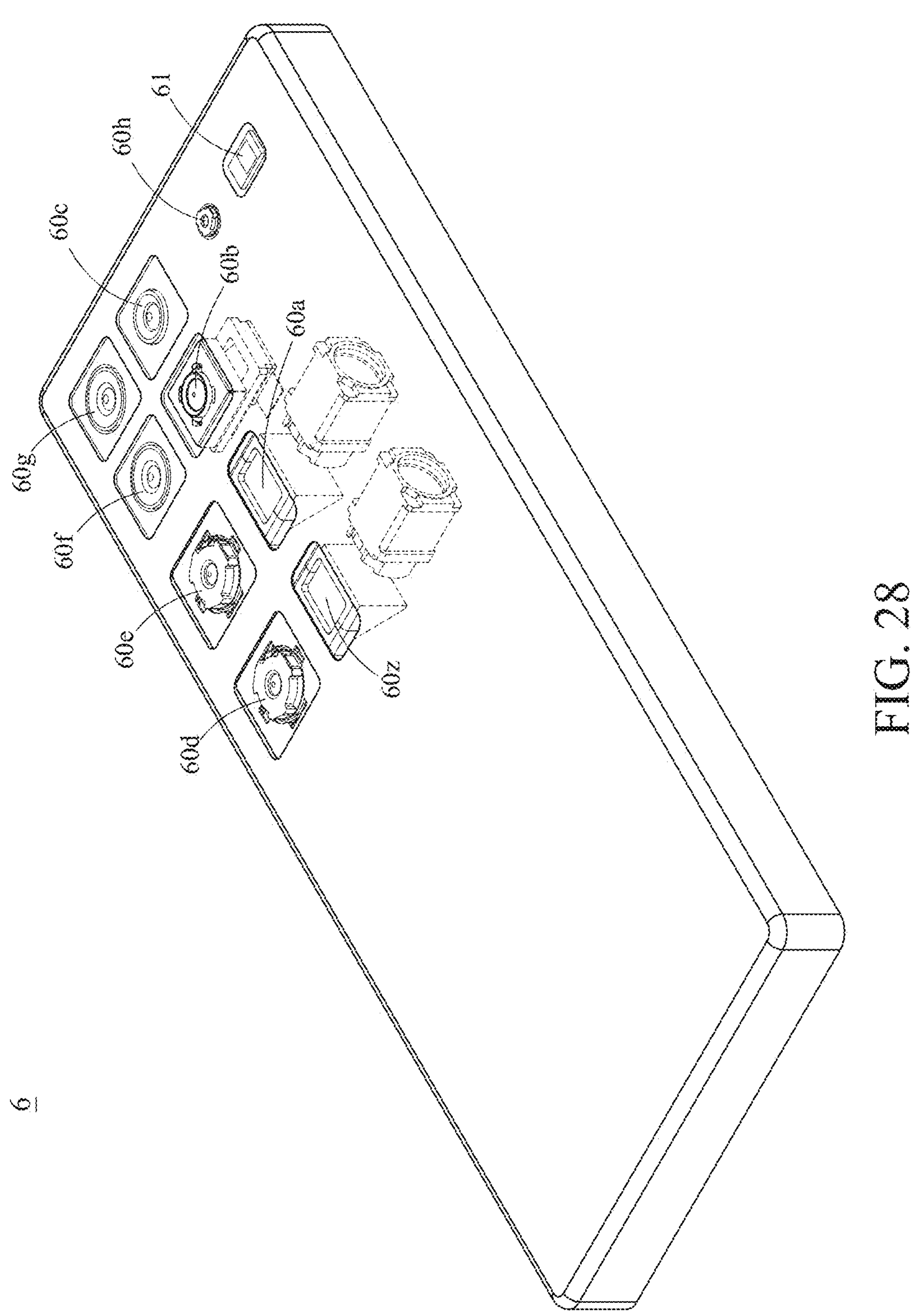
FIG. 28 is one perspective view of an electronic device according to the 6th embodiment of the present disclosure.

Please refer to FIG. 28, which is one perspective view of an electronic device according to the 6th embodiment of the present disclosure.

In this embodiment, the electronic device 6 is a smartphone including an image capturing unit 60_z_, an image capturing unit 60_a_, an image capturing unit 60_b_, an image capturing unit 60_c_, an image capturing unit 60_d_, an image capturing unit 60_e_, an image capturing unit 60_f_, an image capturing unit 60_g_, an image capturing unit 60_h_, a flash module 61, an image signal processor, a display module and an image software processor (not shown). The image capturing unit 60_z_, the image capturing unit 60_a_, the image capturing unit 60_b_, the image capturing unit 60_c_, the image capturing unit 60_d_, the image capturing unit 60_e_, the image capturing unit 60_f_, the image capturing unit 60_g_ and the image capturing unit 60_h_ are disposed on the same side of the electronic device 6, while the display module is disposed on the opposite side of the electronic device 6. In addition, the image capturing unit 60_b_ is the camera module 1 as disclosed in the 1st embodiment, but the present disclosure is not limited thereto. The telephoto image capturing unit 60_b_ can be, for example, one of the other camera modules of the aforementioned embodiments. Furthermore, in addition to the telephoto image capturing unit 60_b_, at least one of the image capturing units 60_z_, 60_a_, 60_c_, 60_d_, 60_e_, 60_f_, 60_g_ and 60_h_ can also be one of the camera modules of the aforementioned embodiments.

The image capturing unit 60_z_ is a telephoto image capturing unit, the image capturing unit 60_a_ is a telephoto image capturing unit, the image capturing unit 60_b_ is a telephoto image capturing unit, the image capturing unit 60_c_ is a telephoto image capturing unit, the image capturing unit 60_d_ is a wide-angle image capturing unit, the image capturing unit 60_e_ is a wide-angle image capturing unit, the image capturing unit 60_f_ is an ultra-wide-angle image capturing unit, the image capturing unit 60_g_ is an ultra-wide-angle image capturing unit, and the image capturing unit 60_h_ is a ToF (time of flight) image capturing unit. In this embodiment, the image capturing unit 60_z_, the image capturing unit 60_a_, the image capturing unit 60_b_, the image capturing unit 60_c_, the image capturing unit 60_d_, the image capturing unit 60_e_, the image capturing unit 60_f_ and the image capturing unit 60_g_ have different fields of view, such that the electronic device 6 can have various magnification ratios so as to meet the requirement of optical zoom functionality. In addition, the image capturing unit 60_z_ and the image capturing unit 60_a_ are telephoto image capturing units having a light-folding element configuration. In addition, the image capturing unit 60_h_ can determine depth information of the imaged object. In this embodiment, the electronic device 6 includes a plurality of image capturing units 60_z_, 60_a_, 60_b_, 60_c_, 60_d_, 60_e_, 60_f_, 60_g_, and 60_h_, but the present disclosure is not limited to the number and arrangement of image capturing unit. When a user captures images of an object, the light rays converge in the image capturing units 60_z_, 60_a_, 60_b_, 60_c_, 60_d_, 60_e_, 60_f_, 60_g_ or 60_h_ to generate an image(s), and the flash module 61 is activated for light supplement. Further, the subsequent processes are performed in a manner similar to the abovementioned embodiments, so the details in this regard will not be provided again.

The smartphones in the embodiments are only exemplary for showing the camera module of the present disclosure installed in an electronic device, and the present disclosure is not limited thereto. The camera module can be optionally applied to optical systems with a movable focus. Furthermore, the camera module features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. A camera module comprising:

a fixed base;

a movable carrier disposed on the fixed base;

a guiding ball disposed between the fixed base and the movable carrier, wherein the guiding ball provides a degree of freedom of movement of the movable carrier relative to the fixed base;

a lens system fixed to the movable carrier;

an image sensor disposed on an image surface of the camera module and configured to receive optical image signal from the camera module;

an auto focus driving device comprising a first magnet element and a first coil element disposed corresponding to each other, wherein the auto focus driving device is configured to provide a driving force for auto focusing of the lens system; and an image stabilization driving device configured to provide a driving force for image stabilization of the image sensor;

wherein each of the fixed base and the movable carrier has a guiding structure, the guiding structure of the fixed base and the guiding structure of the movable carrier correspond to each other and are in physical contact with the guiding ball, so that the movable carrier is movable in a direction parallel to an optical axis of the lens system;

wherein the fixed base has four gate traces, and the four gate traces are respectively disposed on corners of two sides of the fixed base;

wherein the camera module further comprises a reflection element, and an object-side surface and an image-side surface of the reflection element respectively correspond to the lens system and the image sensor;

wherein the fixed base has a first accommodation portion and a second accommodation portion, the reflection element is disposed in the first accommodation portion, and the movable carrier is disposed in the second accommodation portion;

wherein the reflection element is in physical contact with the first accommodation portion of the fixed base; and wherein a distance between a center of the image sensor and the optical axis is D, a height of the first accommodation portion in the direction parallel to the optical axis is H1, a height of the second accommodation portion in the direction parallel to the optical axis is H2, and the following conditions are satisfied:

$$4\ \text{mm}<D<18\ \text{mm};\ \text{and}$$

$$0.3<H1/H2<3.3.$$

2. The camera module of claim 1, wherein the height of the first accommodation portion in the direction parallel to the optical axis is H1, the height of the second accommodation portion in the direction parallel to the optical axis is H2, and the following condition is satisfied:

$$0.5\leq H1/H2\leq 2.5.$$

3. The camera module of claim 1, wherein the reflection element has at least two reflection surfaces configured to reflect an imaging light.

4. The camera module of claim 1, wherein the reflection element is a plastic reflection element, and the reflection element is formed by injection molding process.

5. The camera module of claim 1, wherein the lens system, the reflection element and the image sensor are arranged in sequence along the direction parallel to the optical axis.

6. The camera module of claim 1, wherein a maximum field of view of the camera module is FOV, and the following condition is satisfied:

$$1\ \text{degree}\leq \text{FOV}\leq 45\ \text{degrees}.$$

7. The camera module of claim 1, wherein a focal length of the camera module is EFL, and the following condition is satisfied:

$$10\ \text{mm}\leq EFL\leq 35\ \text{mm}.$$

8. The camera module of claim 1, wherein the distance between the center of the image sensor and the optical axis is D, and the following condition is satisfied:

$$5\ \text{mm}<D<15\ \text{mm}.$$

9. The camera module of claim 1, wherein the image stabilization driving device comprises a second magnet element and a second coil element, the second magnet element is fixed to the fixed base, and the second magnet element is disposed corresponding to the second coil element.

10. The camera module of claim 9, wherein the first coil element of the auto focus driving device is disposed on the fixed base, the first magnet element of the auto focus driving device is disposed on the lens system or the movable carrier, and the second coil element of the image stabilization driving device and the first magnet element of the auto focus driving device are movable relative to the fixed base.

11. An electronic device comprising:

the camera module of claim 1.

* * * * *